(12) United States Patent
Walkingshaw et al.

(10) Patent No.: US 12,211,110 B2
(45) Date of Patent: Jan. 28, 2025

(54) CONTINUOUS ENERGY EVENT DETECTION AND RESPONSE FRAMEWORK

(71) Applicant: Torus Inc., Sandy, UT (US)

(72) Inventors: Nathan Walkingshaw, Sandy, UT (US); Trenton Bond, Provo, UT (US); Leslie Springer, Coalville, UT (US); Weston Bridgewater, Charter Township of Commerce, MI (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/620,605

(22) Filed: Mar. 28, 2024

(65) Prior Publication Data

US 2024/0331064 A1    Oct. 3, 2024

Related U.S. Application Data

(60) Provisional application No. 63/492,778, filed on Mar. 28, 2023.

(51) Int. Cl.
*G06Q 50/06* (2024.01)
*G05B 15/02* (2006.01)
*H02J 3/00* (2006.01)
*H02J 13/00* (2006.01)

(52) U.S. Cl.
CPC ............ *G06Q 50/06* (2013.01); *G05B 15/02* (2013.01); *H02J 3/001* (2020.01); *H02J 13/00004* (2020.01)

(58) Field of Classification Search
CPC ......... G06Q 50/06; G05B 15/02; H02J 3/001; H02J 13/00004
See application file for complete search history.

(56) References Cited

U.S. PATENT DOCUMENTS

| | | | |
|---|---|---|---|
| 2012/0235687 A1* | 9/2012 | Abe | H01M 10/465 324/537 |
| 2016/0079826 A1 | 3/2016 | Paiz et al. | |
| 2020/0127604 A1* | 4/2020 | Kosharovsky | G05B 23/027 |
| 2022/0123552 A1 | 4/2022 | Pathak et al. | |

* cited by examiner

*Primary Examiner* — Yuhui R Pan
(74) *Attorney, Agent, or Firm* — VLP Law Group LLP; Michel Bohn

(57) ABSTRACT

An example system may include an energy storage unit and various processors configured to communicate with components of the energy storage unit to track, classify, and route event data as well as automatically perform actions and notify stakeholders of the event data. The example system may receive event data describing one or more events associated with an energy storage unit and the system may determine that the one or more events include a fault. The system may determine whether the fault is automatically addressable and, responsive to determining that the fault is automatically addressable, automatically execute one or more actions based on the fault. The system may automatically provide a notification describing the fault to a user.

20 Claims, 23 Drawing Sheets

CONTINUOUS ENERGY EVENT DETECTION AND RESPONSE FRAMEWORK

BACKGROUND

The present disclosure relates to addressing faults in local power-production or storage devices, such as flywheel energy storage systems.

Commonly, excess or backup power, such as that produced by solar panels or wind turbines, is stored in chemical storage, such as large chemical batteries. More-recently, other local power storage solutions have included gravity or kinetic energy storage, such as flywheels. Unfortunately, because they are often local to residences, customers, especially larger scale utility organizations, have no optics into the health or operation of these systems. For instance, a utility company may have an understanding of the status of a substation but, otherwise (e.g., beyond the substation at homes or businesses), fault detection is performed reactively and/or manually. When a customer reports a problem with their power to a utility provider, the provider would typically dispatch a truck that travels to the customer's location and either wirelessly reads a meter or physically inspects the local hardware. Accordingly, there is significant delay before fixing problems and repair personnel are often dispatched for minor problems or at an incorrect priority. While reactive monitoring and repair may be inconvenient for some power equipment, for some chemical and mechanical energy storage equipment, reactive monitoring and repair may lead to more serious issues.

For more severe or widespread incidents that occur across multiple customers or systems, utility providers will receive phone calls or reports from local customers that a crisis or other issue is occurring, such as where a power line is down, a home is on fire, there is a larger outage, or otherwise. Based on the phone calls, the provider will dispatch repair trucks, which will travel to the fault location to investigate its severity. In some instances, the repair truck (i.e., a human repair person) will request additional repair vehicles to assist with more severe faults.

SUMMARY

In some aspects, the techniques described herein relate to a computer-implemented method including: receiving, by one or more processors, event data describing one or more events associated with an energy storage unit; determining, by the one or more processors, that the one or more events include a fault; determining, by the one or more processors, whether the fault is automatically addressable; responsive to determining that the fault is automatically addressable, automatically executing, by the one or more processors, one or more actions based on the fault; and automatically providing, by the one or more processors, a notification describing the fault to a user.

In some aspects, the techniques described herein relate to a computer-implemented method, further including: automatically determining, by a local processor of the one or more processors, that the one or more events include an anomalous status of one or more components of the energy storage unit based on the event data, the local processor being local to the energy storage unit; automatically classifying, by the local processor, the one or more events include the fault based on the anomalous status; and automatically reporting, by the local processor, the event data describing the fault to a remote processor of the one or more processors based on the one or more events including the fault, the remote processor being remote to the local processor.

In some aspects, the techniques described herein relate to a computer-implemented method, further including: determining, by the one or more processors, that the one or more actions were not effective in resolving the fault based on data received from the energy storage unit; and automatically reclassifying, by the one or more processors, a severity level of the fault in a database.

In some aspects, the techniques described herein relate to a computer-implemented method, wherein automatically providing the notification to the user includes: determining, by the one or more processors, an alert type based on whether the fault is time sensitive and whether the fault is classified as potentially causing harm; determining, by the one or more processors, an assigned user responsible for addressing the alert type of the fault; and automatically routing, by the one or more processors, the notification to the assigned user.

In some aspects, the techniques described herein relate to a computer-implemented method, wherein: the energy storage unit includes a controller, an inverter, and a battery, the controller being communicatively with the inverter, the controller generating the event data based on data received from the inverter.

In some aspects, the techniques described herein relate to a computer-implemented method, wherein: the energy storage unit includes a controller, an inverter, a battery, and one or more sensors, the controller being communicatively with the inverter and the one or more sensors, the controller generating the event data based on sensor data received from the one or more sensors.

In some aspects, the techniques described herein relate to a computer-implemented method, wherein: the controller detects the fault based on anomalous sensor data.

In some aspects, the techniques described herein relate to a computer-implemented method, wherein: the energy storage unit includes a controller, an inverter, and a battery, the controller determining the fault and transmitting data describing the fault to a remote server; and the remote server routes the event data describing the fault to one or more of a backend database and an analytics service based on the event data describing the fault.

In some aspects, the techniques described herein relate to a computer-implemented method, wherein: the analytics service determines a severity of the fault based on whether an intervention to the fault is possible and whether the fault is time sensitive; and the analytics service classifies the fault as an alert type based on the severity of the fault.

In some aspects, the techniques described herein relate to a computer-implemented method, further including: determining, by the one or more processors, alert routing rules defining to which users the notification is provided based on the alert type.

In some aspects, the techniques described herein relate to a computer-implemented method, further including: determining one or more non-fault events from the one or more events; routing the event data describing the one or more non-fault events to a database for data storage; determining an alert level of the fault; selecting the user from a set of users based on the alert level of the fault; and providing the notification to the selected user based on the alert level.

In some aspects, the techniques described herein relate to a computer-implemented method, wherein: selecting the user from the set of users is further based on context data associated with the fault, the context data including a geographic location at which the energy storage unit is located.

In some aspects, the techniques described herein relate to a system including: an energy storage unit including: a battery storing energy mechanically or chemically; an inverter coupled with the battery and converting direct current from the battery to alternating current; and a controller communicatively coupled with the inverter, the controller receiving data from one or more sensors associated with the energy storage unit and controlling one or more functions of the battery; and one or more processors executing instructions that cause the one or more processors to perform operations including: receiving, by the one or more processors, event data describing one or more events associated with the energy storage unit; determining, by the one or more processors, that the one or more events include a fault; determining, by the one or more processors, whether the fault is automatically addressable; responsive to determining that the fault is automatically addressable, automatically executing, by the one or more processors, one or more actions based on the fault; and automatically providing, by the one or more processors, a notification describing the fault to a user.

In some aspects, the techniques described herein relate to a system, wherein the operations further include: automatically determining, by the controller of the energy storage unit, that the one or more events include an anomalous status of one or more components of the energy storage unit based on the event data, the controller being local to the energy storage unit; automatically classifying, by the controller, the one or more events include the fault based on the anomalous status; and automatically reporting, by the controller, the event data describing the fault to a remote processor of the one or more processors based on the one or more events including the fault, the remote processor being remote to the controller.

In some aspects, the techniques described herein relate to a system, wherein the operations further include: determining that the one or more actions were not effective in resolving the fault based on data received from the energy storage unit; and automatically reclassifying a severity level of the fault in a database.

In some aspects, the techniques described herein relate to a system, wherein automatically providing the notification to the user includes: determining an alert type based on whether the fault is time sensitive and whether the fault is classified as potentially causing harm; determining an assigned user responsible for addressing the alert type of the fault; and automatically routing the notification to the assigned user.

In some aspects, the techniques described herein relate to a system, wherein: the controller generates the event data based on data received from the inverter.

In some aspects, the techniques described herein relate to a system, wherein: the energy storage unit includes one or more sensors, the controller being communicatively with the one or more sensors, the controller generating the event data based on sensor data received from the one or more sensors.

In some aspects, the techniques described herein relate to a system, wherein: the controller detects the fault based on anomalous sensor data.

In some aspects, the techniques described herein relate to a system including: one or more processors; and computer-readable memory storing instructions that, when executed by the one or more processors, perform operations including: receiving, by the one or more processors, event data describing one or more events associated with an energy storage unit; determining, by the one or more processors, that the one or more events include a fault; determining, by the one or more processors, whether the fault is automatically addressable; responsive to determining that the fault is automatically addressable, automatically executing, by the one or more processors, one or more actions based on the fault; determining, by the one or more processors, a severity level of the fault based on the event data associated with the fault; and automatically providing, by the one or more processors, a notification indicating the fault to a user based on the severity level of the fault.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIGS. 8A-8C illustrate example interfaces in which faults are identified for one or more energy storage units.

DETAILED DESCRIPTION

Figure 1:
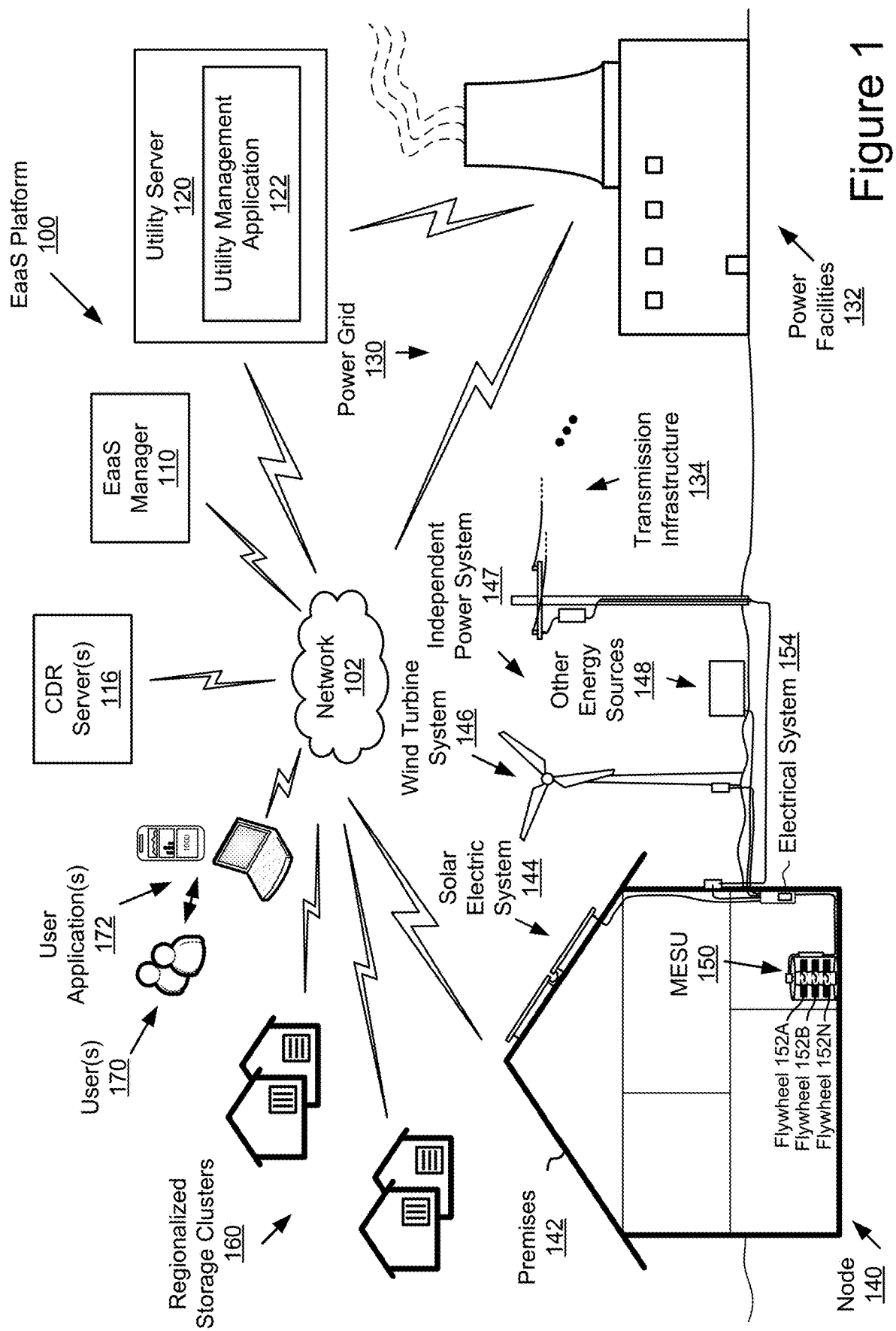
FIG. 1 is a block diagram of an example energy as a service platform.

This description includes several improvements over previous solutions, such as those described in reference to the Background. Systems and methods are described for providing an energy emergency response framework in which events in energy production, storage, and use are detected and a response is automatically generated depending on the event's context, such as addressing faults in local power production or storage devices, which may be at residences, businesses, electric vehicle charging stations, or otherwise.

In some implementations, one, two, or more mechanical-energy storage units may be installed at a residence to provide backup power in case of a power outage, to store electricity generated using residential solar panels, or to offset unevenness of power production and usage (e.g., electrical storage at a residence may be controlled to address the unevenness at the residence, nearby residences, or across the power grid). A mechanical-energy storage unit may be buried or mounted next to an electrical panel or placed in a shed outside a residence, placed in a garage or utility room, or stored offsite.

In some implementations, multiple mechanical-energy storage units may be coupled together at the same or distinct locations to scale energy backup at a larger facility, such as a business, or by an electrical utility. For instance, many mechanical-energy storage units may be placed at a facility, whether buried or above ground for use by the facility or by an electrical utility provider. The multiple mechanical-energy storage units may include or be coupled to MESU (mechanical energy storage unit) control units that may be communicatively linked to each other or to a central server to control storage and distribution of the stored energy (e.g., by controlling the rotational frequency of a flywheel to keep various flywheels at efficient speeds).

In some implementations, the energy storage unit (ESU) may be based on a flywheel, chemical battery, supercapacitor, etc., as described in further detail in reference to the figures herein.

The technology described herein can provide monitoring, analysis, troubleshooting, and/or alerting on a local, individual (e.g., a single ESU or FESS) level and/or end to end across single, multiple, clusters, or an entire network or energy ecosystem of energy storage units. The technology may provide second-by-second monitoring and alerting in which faults are categorized and automatically addressed where possible, tiered by severity (e.g., alpha, bravo, charlie, delta, echo, etc.). Where the technology determines that a fault requires action that cannot be automatedly addressed locally, it may automatically digitally trigger, using firmware on a local device (e.g., by firmware operating on a controller of a FESS) a human or other external response, which trigger message may include triage/severity information. As faults can be automatically identified, response time is shortened, uptime is improved, and safety is increased.

The technology allows rapid, continuous monitoring of local hardware (e.g., a flywheel or battery), which may be addressed, analyzed, and/or categorized on an individual level and/or across multiple devices. For instance, the system and method may determine the generation, use, and storage of each ESU (e.g., at a specific house) or cluster of ESUs (e.g., a group of flywheels at one or more locations), potentially down to the circuit level. These and other features may be provided using the technologies described in further detail below.

As data is sampled from various sources and/or sensors at a device, the controller or other computing device may perform operations described below to perform operations locally at an ESU or escalate it, as determined. Alert messages generated by the local system may be processed on the cloud either independently or in conjunction with the local device (e.g., the ESU), as described below.

For example, a flywheel or chemical battery power storage system may have various devices and sensors that generate data that identify faults either independently or as combinations. For instance, the CNS (central nervous system, controller, inverter computing device, etc.) may receive and process the data to identify faults and/or perform other operations, as described in further detail below. In some implementations, depending on the fault, the CNS may take local action to address a fault and/or may transmit an alert message to a server, which processes the fault/alert message(s) and perform other operations, such as bucketizing and/or triaging, issuing commands to the ESU (e.g., a CNS communicatively coupled with a battery, inverter, etc.), or dispatching repair personnel based on the fault, alert, bucket, severity level, etc. In some implementations, as noted below, the data for multiple devices may be combined and analyzed for a cluster, arrangement, geographic area, etc., to determine systemic issues.

Example data and sensors that are monitored for a local energy storage and/or production device may include temperature, accelerometer, rotation, gyroscopic, orientation, voltage, current, state of charge, or otherwise for one or more components of the system, such as the CNS, inverter, meter, flywheel, chemical battery, supercapacitor, solar system, wind turbine, etc. In some implementations, the CNS may also be coupled with external sensors, such as weather stations, etc., which it may use in detecting or categorizing an event. The CNS may aggregate the signals and detect outliers that, by themselves, over a defined time period, or in combination with other data/signals indicate a fault.

For example, the CNS may determine that there is a high voltage alert with the local system indicating a voltage higher than the system is designed to handle. The CNS may determine that a fault has been detected, generate a message describing the fault, and send the message to a server where it is processed to determine severity and further actions. For instance, the CNS may take local actions, such as spinning down a flywheel, discharging a battery, shutting down an inverter, or other actions, such as those described elsewhere herein.

In another example, a CNS may detect that a battery has a temperature beyond a defined threshold. The CNS may determine, for instance, based on the relative temperature, a severity level and take immediate local remedial action, such as shutting down the device, decreasing flywheel velocity, etc., in addition or alternative to sending the fault message. For example, the CNS may locally detect excessive battery temperature, power down the system, and transmit a fault message rather than waiting for a server response to do so. The CNS or server may elevate a fault severity level, classification, or otherwise flag it if multiple or certain alerts come in at the same time, as noted below.

The faults or events can be digitally triaged by the server to generate an alert and, based on the severity level of the alert, the server (e.g., directly or in conjunction with another service), may dispatch a repair team/vehicle based on the fault/alert, etc. Furthermore, if a certain alert level has been reached for certain faults, the server may automatically take other actions, such as automatically transmitting a message that causes emergency services to be dispatched to the location corresponding to the fault. For instance, if a certain battery temperature (e.g., over 500 degrees Celsius) is detected, the technology may determine that a fire or explosion is occurring or imminent and may communicate with a local fire department to dispatch a fire truck and/or take other measures.

In some implementations, if a customer that owns the ESU is traveling, the CNS and/or server may look at the thermal runaway of a battery and digitally triage it, dispatch a repair truck, and/or automatically dispatch fire and/or emergency medical services to the location even without the customer providing any interaction.

Fault messages may be processed both locally and on a separate device, such as one or more cloud servers or services, and the fault messages may include information identifying the specific fault, such as sensor information, timing, location, specific battery, flywheel, or other component data, etc. Accordingly, in associating individual data or faults with individual local devices (e.g., devices at one or more different residences), the server may localize a problem to a specific component, specific MESU, specific residence or location, specific cluster of MESUs, etc. For instance, the server may determine that multiple MESUs in a cluster are reporting the same faults and may, therefore, identify a larger issue or a higher priority alert.

Due to the local and remote processing, as well as the other features described herein, the architecture is highly scalable to grow organically, for instance, as additional devices are added to a location or cluster, or as a provider monitors increasing quantities of devices. Accordingly, the provider can gain insight into local devices and circuits in ways that were not previously possible. For example, where ESUs are located at individual residences, individual residences can be monitored (e.g., by a customer or a provider), clusters of residences, subdivisions, etc., can be monitored either locally, at a subdivision/cluster level, or by a utility or provider.

Where faults in a certain device could affect other devices coupled therewith (e.g., in a cluster of MESUs), the system may automatically adjust the faulty device to protect the other devices, adjust the other devices to balance load, or otherwise. Similarly, where a systemic fault is detected across multiple devices, the system may elevate the issue and provide real-time, accurate data, so that the correct type or quantity of repair trucks may be dispatched to the correct locations, rather than necessarily having to dispatch a first truck to investigate and an additional truck when a more severe issue is determined by the dispatched engineer.

Additionally, as additional devices are monitored, machine learning models can be used across the devices to improve accuracy of fault detection, for instance, by using supervised machine learning to adjust weights for both fault detection and categorization.

It should be noted that while certain features are summarized here, and in the figures, other features are possible and contemplated herein.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

The innovative energy technology disclosed in this document provides novel advantages including the ability to integrate modern technology with conventional power infrastructure; enable rapid transition to renewable energy sources; provide backup to the power grid, use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

The innovative energy technology disclosed in this document provides novel advantages including the ability to integrate modern technology with conventional power infrastructure; enable rapid transition to renewable energy sources; use the power grid as a backup; store power locally in nodes and regionalized storage clusters of node(s); isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

As depicted in FIG. 1, the innovative energy technology described herein may comprise an energy as a service platform (EaaS platform) 100. The EaaS platform 100 may include an EaaS manager 110, one or more continuous detection and response (CDR) servers 116, user application(s) 172 operable on computing devices accessible to and interactable by user(s) 170 of the EaaS platform 100 and configured to send or receive data to the EaaS manager 110, regionalized storage clusters 160 comprised of one or more nodes 140, and the power grid 130 that comprises one or more power facilities 132 that are connected to a power transmission infrastructure 134.

A node 140 may be comprised of a power consuming entity and at least one ESU (e.g., a MESU 150 with a flywheel 152 is provided as an example, although chemical, etc., batteries may be used in addition to or alternative to the flywheel(s) 152, such as the example ESU 402 described below). A node 140 may be an entity that either consumes power itself or is coupled to entities that consume power. In FIG. 1, a node 140 is depicted as a premises 142, such as a residential home, but it should be understood that any entity that consumes power is applicable, such as one or more appliances, a commercial structure such as a warehouse or office building, an electronic device or system (whether configured to move or static), a transportation system and/or vehicle, a transportation charging system, a power supply, a power substation, a power substation backup, etc. A regionalized storage cluster may include two or more nodes 140 in a given geographical region. A storage cluster may provide power banking functionality, as discussed further herein. The elements of the node 140 including the MESU(s) 150, the independent power system 147, the power grid 130, and/or any appliances and/or other entities, may be electrically coupled via an electrical system 154 including wiring, junctions, switches, plugs, breakers, transformers, inverters, controllers, and any other suitable electrical componentry.

In the depicted example, a node 140 is equipped with or coupled to power generating technology, such as an independent power system 147 and/or the power grid 130. The independent power system 147 may comprise power generating technology that is localized and that allows for independent power generation, such as renewable power generating technology. Non-limiting examples include a solar electric system 144 (comprising a solar array, controllers, inverters, etc.), a wind turbine system 146 (comprising turbine(s), controllers, inverters, etc.), and/or other energy sources 148, such as hydropower, geothermal, nuclear, systems and their constituent components, etc. The power generating technology may additionally or alternatively be conventional carbon-based power generating technology such as the depicted power grid 130, although for carbon negative or neutral implementation, a greener power generating technology may be preferred.

The node 140 may include or be coupled to an energy storage unit that is capable of storing excess power that is produced by the power generating technology. In some implementations, the energy storage unit may comprise a mechanical-energy storage unit (MESU) 150. The MESU 150 includes one or more flywheels 152A, 152B . . . 152N (also simply referred to individually or collectively as 152). The MESU's 150 convert the electricity received from the power generating technology to kinetic energy by spinning up (increasing the spin rate) of the flywheels 152.

Each flywheel 152 may be configured to store up to a certain maximum amount of energy. By way of non-limiting example, a motor 310 coupled to the flywheel 152 may be configured to spin the flywheel 152 up to between 15,000 rotations per minute (RPM) and 25,000 RPM, such that the flywheel 152 may store between 18 kilowatt hours (kWh) and 28 kWh of electricity. Combined, three stacked flywheels 152 could store between 54 kWh and 84 kWh of power. During hours in which the power generation technology, such as the solar cells, produce less power than what is consumed by the electrical apparatuses (e.g., appliances) of the premises 142, the motor 310 may be operated as a generator that converts the kinetic (mechanical) energy stored in the flywheel 152 to electricity, thereby pulling power from the flywheel 152 to meet the local power needs of the node 140 (e.g., power the electrical apparatuses of the premises 142). In this example, advantageously the node 140 may use an average of 15 kWh of power daily and the MESU 150 is capable of powering the node 140 fully for about 4-6 days should the local power generating cease to produce any power. It should be noted that these speeds and capacities are provided by way of example and that other implementations are possible and contemplated herein.

In another example, as discussed further elsewhere herein, a utility may be integrated with the EaaS manager 110 and its utility management application 122 signal the power management application 111 via the node APIs 113 that it is experiencing a surge in demand for power, and the power management application 111 may signal a node 140 or cluster of nodes 140 (e.g., storage cluster 160) to spin off power from the flywheels 152 and provide the energy back to the grid through the transmission infrastructure 134, which may be connected to the node(s) 140 through connection points (e.g., two or three phase electrical service drops or buried power lines connected to a service panel, which typically includes power meter(s)). Conversely, the utility may be producing excess power and may wish to bank/store the power. The utility management application 122 may signal the power management application 111 via the node APIs 113 that it needs to store a given amount of power, and the power management application 111 may in turn signal a node 140 or cluster(s) of node(s) 140, such as one or more regionalized storage clusters 160 to inform them of the storage need, and node(s) 140 in those storage cluster(s) 160 that have excess capacity and are configured to receive power from the grid may receive the power through the transmission infrastructure 134 and store it as mechanical energy in the MESUs for later retrieval. The EaaS platform 100 may charge the utility for the power banking service, as discussed further elsewhere herein.

It should be understood that the RPMs and kWh figures provided in the herein are meant as non-limiting examples and that the MESU's 150 may be configured with flywheels 152 that are capable of storing more or less power depending on the implementation. For example, the weight of the flywheels 152, the materials used for the flywheels 152, the size and configuration of the flywheels 152, the efficiency of the motor 310 and bearings, and so forth, may all be adjusted based on the use case to provide a desired amount of back-up power for the node 140. By way of further example, a flywheel 152 may be made of steel, aluminum, carbon fiber, titanium, any suitable alloy, and/or any other material that is capable of handling the cycles, vibration, radial and sheer stress and strain, and other conditions to which such a flywheel 152 would be subjected.

The power transmission infrastructure 134 comprises a power network that couples power-consuming entities, such as homes, offices, appliances, etc., to power facilities that generate power from carbon, nuclear, and/or natural sources. The transmission infrastructure 134 may include intervening elements, such as step-up transformers, substations, transmission lines, and so forth, which are interconnected to provide power widely to different geographical regions.

A power utility (also simply referred to as a utility), which may own and operate one or more power facilities and portions of the transmission infrastructure 134, may operate a utility server configured to execute a utility management application 122. The utility management application 122 may perform various functions such as load balancing, load managing, and grid energy storage, to manage the supply of electricity based on real-time demand. However, given the limitations of existing grid technologies, power outages, brownouts, and expensive peak power costs are still the norm.

A user may use an instance of a user application 172 executing on a computing device, such as the user's mobile phone or personal computer, to configure and interact with the MESU(s) 150 that they are authorized to control, such as a MESU 150 installed at their home or business, as discussed further elsewhere herein.

As shown in FIG. 1, the EaaS manager 110, the utility server 120, the power facilities 132, elements of the power grid 130, the wind turbine system 146, the solar electric system 144, the other sources 148, the node(s) 140, the regionalized storage clusters 160, the user applications 172 and associated computing devices, etc., may be coupled for communication and connected to the network 102 via wireless or wired connections (using network interfaces associated with the computing devices of the foregoing elements). The network 102 may include any number of networks and/or network types. For example, the network 102 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The EaaS manager 110, the CDR server(s) 116, the utility server 120, the node(s) 140, the power facilities, and the user devices may have computer processors, memory, and other elements providing them with non-transitory data processing, storing, and communication capabilities. For example, each of the foregoing elements may include one or more hardware servers, server arrays, storage devices, network interfaces, and/or other computing elements, etc. In some implementations, one or more of the foregoing elements may include one or more virtual servers, which operate in a host server environment. Other variations are also possible and contemplated.

The continuous detection and response (CDR) server(s) 116 may include one or more computing device external to a node 140, which may be used to provide event detection and response, such as is described in further detail throughout this disclosure. For instance, a node 140 may include a central nervous system (CNS) 412 that operates on the node 140, which may also run the flywheel controller 254 and/or node application 240, although other implementations are possible and contemplated herein. The CDR server(s) 116 may include one or more remote computing devices or servers that provide analysis, reporting, or other services, such as those described in further detail in reference to FIGS. 4A-11F herein.

Depending on the implementation, the CDR server(s) 116 may be integrated with the EaaS manager 110 and/or the utility server 120, although it should be noted that other implementations are possible and contemplated herein.

Figure 2:
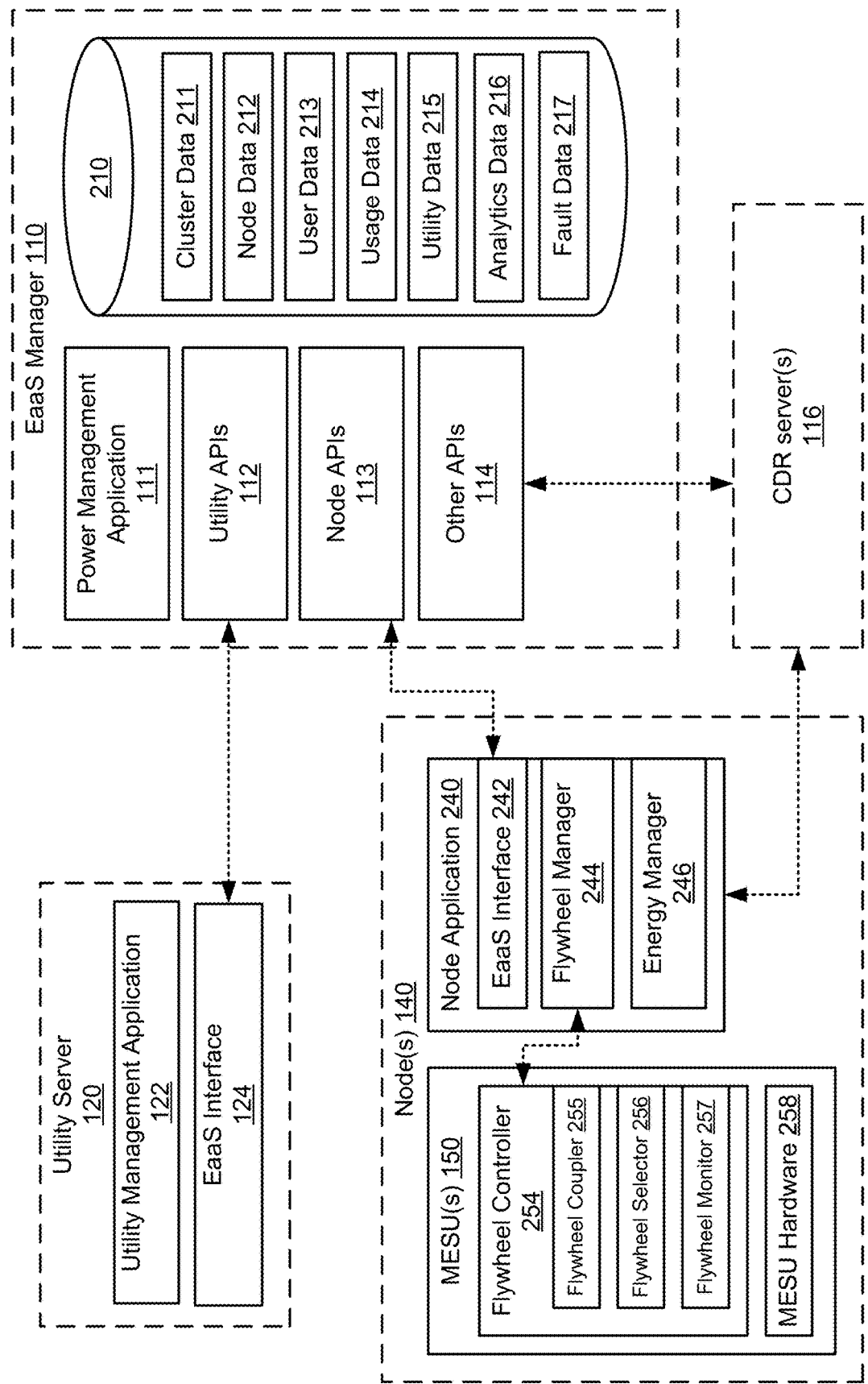
FIG. 2 is a block diagram showing example components of, and the interaction between components of the energy as a service platform.

It should be understood that the EaaS platform 100 illustrated in FIG. 1 and the diagram illustrated in FIG. 2 are representative of example systems and that a variety of different system environments and configurations are contemplated and are within the scope of the present disclosure. For example, various acts and/or functionality may be moved between entities (e.g., from a server to a client, or vice versa, between servers, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc., without departing from the scope of this disclosure.

FIG. 2 depicts a block diagram showing example components of, and the interaction between, the utility server 120, the node(s) 140, the CDR server(s) 116, and/or the EaaS manager 110. The utility server includes an instance of the utility management application 122 and an EaaS interface 124. The EaaS manager 110 includes a power management application 111, utility APIs 112, node APIs 113, other APIs 114, and a data store 210. The data store 210 may store and provide access to data related to the EaaS platform 100, such as cluster data 211, node data 212, user data 213, usage data 214, utility data 215, analytics data 216, and fault data 217.

A node 140 may include one or more ESU(s) 150 or 402, including the chemical or other forms of electrical storage that are discussed herein, although a MESU 150 is provided as an example.

A MESU 150 may include an instance of a flywheel controller 254, which may be or include a central nervous system (e.g., the CNS 412 described elsewhere herein). For instance, the CNS 412 may run or execute the flywheel controller 254 and its components, and the node application 240 and its components. In some implementations, the flywheel controller 254 may include a flywheel coupler 255, a flywheel selector 256, and flywheel monitor 257. The MESU hardware 258 may comprise a chassis, one or more flywheels 152, magnets and/or bearings, a flywheel coupler 255, and/or a motor-generator (e.g., the motor 310 referenced below). The motor-generator may be coupled to each flywheel 152 via a flywheel coupler 255. The flywheel coupler 255 may engage and disengage the motor-generator from the flywheel 152, such that each flywheel 152 may spin freely when disengaged and may be coupled to the motor-generator when engaged such that the motor-generator may increase the speed of the flywheel 152 (spin up the flywheel 152), or the flywheel 152 may spin the generator to produce power. Each flywheel 152 may be levitated using magnets to minimize the friction caused by the rotation of flywheel 152. As an example, a maglev unit may be used to suspend and retain the flywheel 152 while spinning.

Additionally, or alternatively, bearings, such as but not limited to ceramic bearings, may be used to support and retain the flywheel 152 while spinning. The chassis may house and support the flywheels 152, flywheels 152 may be arranged horizontally or vertically. In horizontal orientation, flywheels 152 may have a wheel-like shape and may be stackable one on another in the same chassis, but still configured to spin independently of one another. In such a configuration, the coupler may couple to each flywheel 152 independently, or more than one coupler and motor 310 may be used, depending on the implementation. In a vertical orientation, the flywheels 152 may have a roll like shape, and may be positioned parallel to one another in the chassis. In either orientation, in some implementations, the chassis may include a housing that encloses the MESU 150 and provides a vacuum environment in which the components of the MESU 150 may operate. This is advantageous as it may seal out dirt, debris, and corrosion causing elements, and allow for the flywheels 152 and other components to optimally operate.

In some implementations, a node 140 may include one or more controllers, such as the flywheel controller 254 or CNS 412, or other computing devices that may receive and process information from the EaaS manager 110 and/or CDR server(s) 116 for the two or more MESU(s) 150, and may send signals to the MESU(s) 150 (e.g., via the flywheel controller 254 and/or MESU hardware 258) and receive and process signals from the MESU(s) 150 (e.g., via the flywheel controller 254 and/or MESU hardware 258), to control the functionality and operations of the MESU(s). In some further implementations, the structure, acts, and/or functionality of the flywheel controller 254 and the node application 240 and their constituent components may be combined, and the node 140 may represent a MESU(s) 150 itself, to which one or more appliances that consume power may be coupled to receive power. Other variations are also possible and contemplated.

For example, in some implementations, the some or all of the CDR server(s) 116 or the components or services thereof may be integrated with the EaaS manager 110 or utility server 120 (e.g., and/or the EaaS manager 110 and/or utility server 120 may be CDR server(s) 116). The CDR server(s) 116 may be one or more separate computing devices or servers that may be located remotely from one or more of the node(s) 140, the EaaS manager 110, and/or utility server 120. Depending on the implementation, the CDR server(s) 116 may communicate directly with the node(s) 140 (e.g., with a flywheel controller 254, node application 240, or CNS 412) or may communicate with the EaaS manager 110 to communicate with the node(s) 140 (e.g., where the EaaS manager 110 acts as an intermediary between the node(s) 140 and the one or more of the CDR server(s) 116. For instance, the CDR server(s) may communicate with the EaaS manager 110 (e.g., via the other APIs 114) to receive node data 212, determine user data 213, determine fault data 217, store fault data 217 (e.g., store events, faults, or alerts), or perform other operations.

The utility management application 122, CDR server(s) 116, CNS 412, flywheel controller 254, node application, node management application, utility APIs, node APIs, MESU APIs, and/or other devices may each include hardware and/or software (e.g., stored in computer readable memory) executable on one or more processors to provide the acts and functionality disclosed herein.

Specifically, the utility management application 122 may be executable by the utility server 120 to monitor power generation and distribution by one or more power facilities and a transmission infrastructure 134. The utility management application 122 may receive signals from various entities of the EaaS platform, such as the EaaS manager 110, the nodes, the transmission infrastructure 134, other utility management applications associated with other providers, and so forth. The utility management application 122 may communicate via the EaaS interface 124 with the EaaS manager 110 to access the services provided by the EaaS manager 110. In particular, the EaaS interface 124 may interact with the utility APIs of the EaaS manager 110 to request power banking, request the provision of supplemental power, to provide usage, performance, and/or demand data, and so forth. In some implementations, the EaaS interface 124 may generate and transmit a secure request via the network to the utility APIs. The power management application 111 may receive the request via the utility APIs and process it accordingly.

The power management application 111 may be coupled to the data store 210 to store and retrieve data. The data stored by the data store 210 may be organized and queried using any type of data stored in the data store (e.g., cluster ID, user ID, utility ID, node ID, MESU ID, configuration data, etc.). The data store 210 may include file systems, databases, data tables, documents, or other organized collections of data.

Cluster data 211 may comprise information about a cluster of two or more nodes (e.g., regionalized storage cluster), such as the identity of the node(s) 140, the storage capacity of the storage cluster 160, the availability of the storage cluster 160, the operational health of the storage cluster 160 and/or constituent MESU(s) 150, the historical performance of the storage cluster 160, etc.).

Node data 212 may comprise information about a node, such as the number of MESUs installed at the node 140, the type of node 140, the operational health of the MESU(s) 150, any restrictions or operation parameters of the MESU(s) 150, configuration data for the MESU(s) 150, identifiers of the MESU(s) 150, who the MESU(s) 150 belong to, whether the MESU(s) 150 can be used for banking grid power, whether the MESU(s) 150 have been inactivated, and so forth.

User data 213 may comprise information about the user associated with a storage cluster 160, node 140 or MESU 150, including user account information, login information, user preferences governing the MESUs (e.g., schedule data, activation/inactivation data, etc.).

Usage data 214 may comprise information about the usage of the clusters and/or MESU(s) 150, such as spin rates of the flywheels 152, power output levels, maintenance periods, downtime, inactive periods, third-party use (e.g., use by utilities or neighboring nodes 140), etc.

Utility data 215 may comprise information about utilities that have partnered with the EaaS platform 100, such as utility account information, utility capability information, power banking requirements, contractual parameters, performance requirements, power grid 130 specifications, etc.

Analytics data 216 may comprise insights about the EaaS platform 100, such as local vs. grid power generation, aggregate usage data, aggregate performance data, etc. It should be understood that any other data that would be suitable and applicable to the EaaS platform 100 may be stored and processed by the EaaS manager 110.

Fault data 217 may comprise event data describing events on the node(s) 140, such as any event generated by a battery, flywheel, inverter, sensor data from sensors, or other MESU hardware 258. The event data may include metadata describing a source of the event data, location, timestamps, concurrent data, etc. The event data may describe events, flag or tags on events, whether an event includes a fault (e.g., whether a value of an event data point satisfies a threshold or other defined quantity), whether an event is classified as an alert, thresholds against which data is compared to detect faults, and other data. For instance, fault data 217 may include any of the data described below in reference to the methods and graphical user interfaces, such as sensor data, voltages, state of charge, etc.

The node application 240 and the flywheel controller 254 may communicate with the EaaS manager 110 via the EaaS interface 242, which is configured to interact with the node APIs 113 surfaced by the EaaS manager 110. The node APIs 113 provide methods for accessing data relevant to the node 140 and the MESU(s) 150 associated with the node 140, and executing various functionality, such as signaling unavailability/availability for banking power, requesting a functional upgrade, such as a higher spin rate for one or more flywheels 152 or deactivating/activating a previously active/inactive flywheel 152, reporting usage data and/or state information, and so forth.

The flywheel manager 244 of the node application 240 may be configured to communicate with the flywheel controller 254 to provide operational control signals, such as power banking signals, power extraction signals, spin rate adjustment signals, flywheel enablement/disablement signals, and so forth. The energy manager 246 is configured to communicate with the flywheel manager 244 and provides controls signals to the flywheel manager depending on the energy requirements (produce energy for local use, produce energy for utility use, bank local energy, bank utility-provided energy, etc.).

The flywheel coupler 255 may be configured to control the mechanical coupling of the flywheels 152 with the motor-generator 310, the flywheel selector 256 is configured to select which flywheels 152 to control based on the received control signals, and the flywheel monitor 257 monitors the state of each flywheel 152 for safe operation and performance within defined operational parameters, and can take control of the functionality of the MESU hardware 258 and shut down, slow, suspend, adjust, optimize, or other control the MESU hardware 258 depending on the monitored state.

Figure 3A:
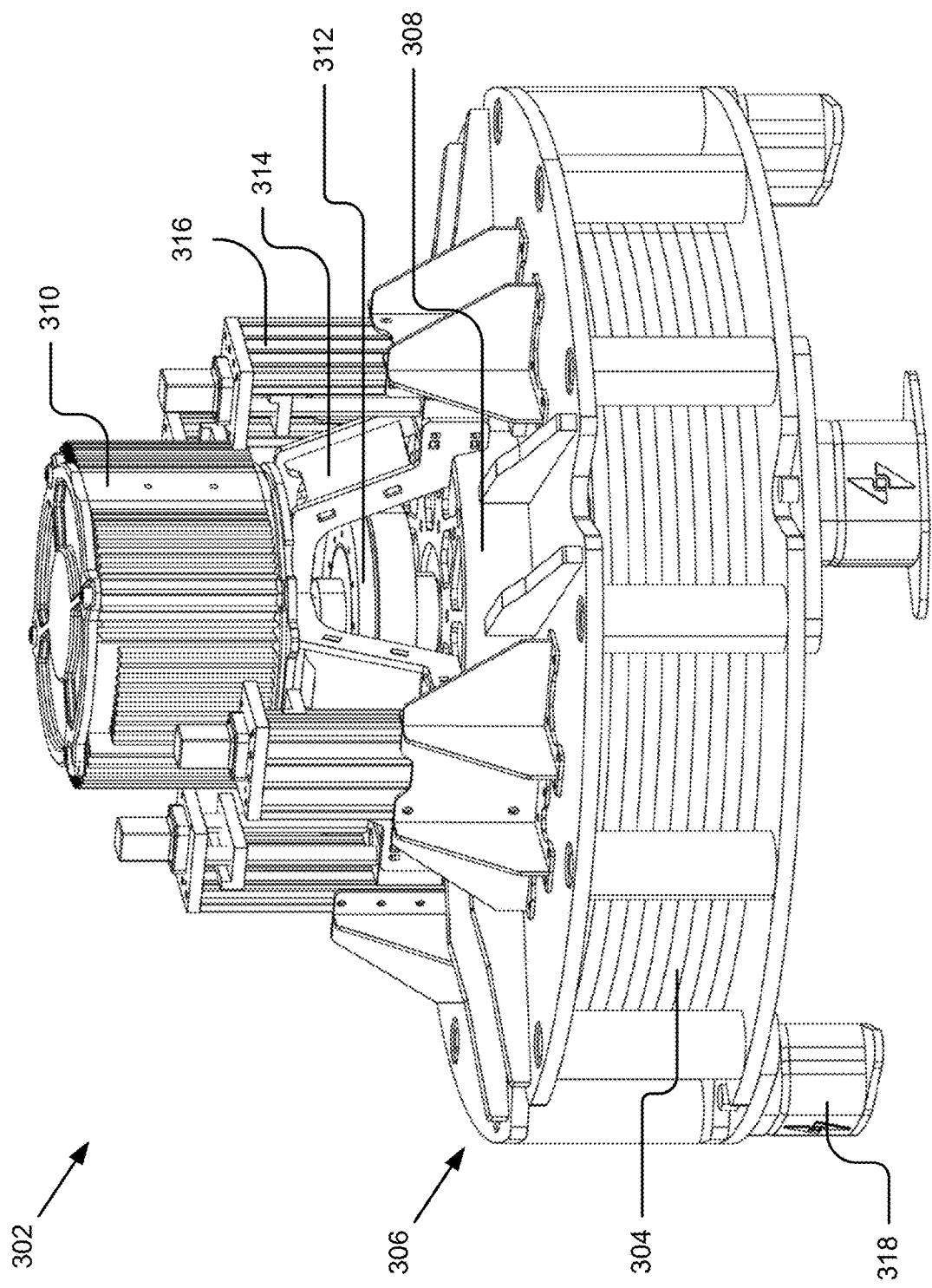
FIGS. 3A and 3B illustrate example energy storage unit assemblies.
Figure 3B:
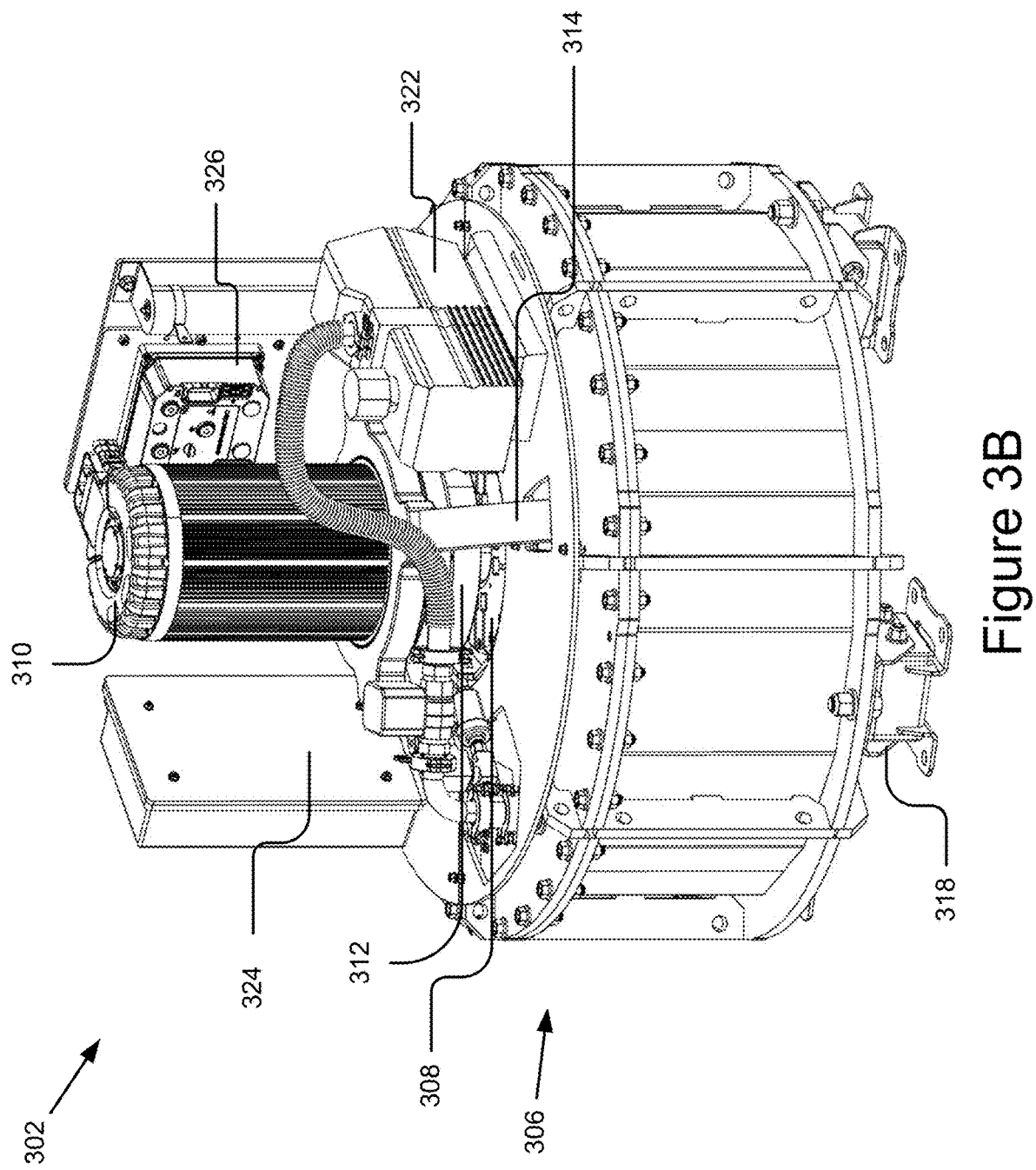

FIGS. 3A and 3B illustrate example implementations of a mechanical-energy storage unit (MESU) assembly 302 that may use a flywheel 304 to store energy using rotational momentum. FIG. 3A illustrates a perspective view of an example MESU assembly 302 with an open housing 306 to expose a flywheel 304. FIG. 3B illustrates a perspective view of an example MESU assembly 302 with an enclosed housing 306. FIG. 3B also illustrates various components, such as a supercapacitor 324 or battery, a vacuum pump 322, and a computing device 326 (e.g., a CNS 412).

It should further be noted that, for the purposes of this disclosure, the flywheel 304 and MESU assembly 302 are provided only by way of example and that other local energy storage devices are possible and contemplated. In some implementations, the technology may apply to chemical or other energy storage, such as chemical batteries, supercapacitors, flywheels, gravity-based batteries, and/or combinations thereof.

For example, while other implementations are possible and contemplated herein, FIGS. 3A and 3B illustrate example mechanical-energy storage unit (MESU) assemblies 302, that use a flywheel 304 to provide energy storage. As illustrated in the example implementation of FIGS. 3A and 3B, a MESU assembly 302 may include a flywheel housing 306 providing support to a flywheel bearing 308 that provides support to the flywheel 304. The flywheel bearing 308 may suspend and allow a flywheel 304 to rotate within a cavity or space in the flywheel housing 306, for example, about a central axis of rotation. A motor-generator 310 may be coupled or couplable with the flywheel 304 via a flywheel coupler 312 to exert rotational force thereon or receive rotational force therefrom. In some implementations, the MESU assembly 302 may include various other components, such as frames, actuators, electronics, cases, reinforcements, legs 318, etc., which are described elsewhere herein.

It should be noted that, although certain components and configurations are described herein, other implementations are possible and contemplated herein. For example, a MESU assembly 302 may include fewer, additional, or different components. In some implementations, the MESU assembly 302 may have various other configurations, for example, it may be oriented in various directions, such as where a motor 310 is located below the flywheel 304 or at a side of it, or otherwise.

In some implementations, although not illustrated in the examples of FIGS. 3A and 3B, the MESU assembly 302 may include other components, such as inverters, wiring, switches, sensors, transformers, and/or other power converting or transmission equipment that communicates electrical current from and/or to an external power source, such as an electrical service panel, solar panel system, electrical grid, etc. The equipment may additionally or alternatively couple the MESU assembly 302 to various loads, such as a power grid, electrical service panel, electric vehicle charger, etc.

In some implementations, the MESU assembly 302 may include and/or be coupled with various control equipment, such as a computing device or other control unit that executes various operations, etc. For example, the MESU assembly 302 may be part of a node 140 and coupled with a flywheel controller 254 and/or node application 240. For example, the MESU assembly 302 control unit may represent an implementation of the flywheel controller or one of its components. The MESU assembly 302 control unit, etc., as described above may perform various operations respective to the MESU assembly 302, such as described in further detail elsewhere herein.

The example MESU assembly 302 may include one or more chemical batteries, supercapacitors, inverters, motors, or other components, which may be monitored by one or more sensors. For instance, the MESU assembly 302 may include temperature, rotation, and acceleration sensors in or adjacent to the bearings or axils of the flywheel. Similarly, temperature sensors may be located adjacent to a chemical battery or other components. An inverter may be coupled with the MESU assembly's 302 controller and may provide various other information, such as current, voltage, etc. Accordingly, as noted in more detail elsewhere herein, status or diagnostic data may be gathered by the controller and used, by the controller (e.g., a flywheel controller 254, node application 240, CNS 412, etc.), to identify faults or other events. The controller may automatically perform operations locally and/or transmit messages to a remote server for further processing.

In some implementations, all or a portion of the MESU assembly 302 may be placed within a case or enclosure to provide protection to the MESU assembly 302, protection from potential flywheel structural failure, and/or a vacuum, which increases flywheel efficiency. For example, a vacuum may be permanent or actively maintained using a vacuum pump 322. An example enclosure is described in further detail below.

For example, as illustrated in FIG. 3B, the enclosure 306 may be fully enclosed to house a flywheel 304 therein. The enclosure 306 may include a vacuum pump 322 coupled with the top of the enclosure 306, which may be powered by the motor/generator 310, supercapacitor 324, a battery (not shown), an external grid, or otherwise. The pump 322 may maintain a given vacuum pressure inside the enclosure 306 in order to reduce resistance on the flywheel 304. In some implementations, the vacuum pump 322 and/or enclosure 306 may include one or more sensors indicating a status and/or pressure of the pump 322 or enclosure 306.

As illustrated in the example of FIG. 3A, the MESU assembly 302 may include a flywheel 304 including one or more plates coupled at a central axis of rotation to a flywheel bearing 308, which allows the flywheel 304 to rotate about the central axis. The flywheel 304 may be housed within and supported (e.g., by the flywheel bearing 308) by the flywheel housing 306. The MESU assembly 302 may include a motor 310 assembly including a motor 310 adapted to convert an input electrical current to rotational momentum by spinning up the flywheel 304 and/or convert the rotational momentum of the flywheel 304 into an output electrical current. The flywheel 304 may be coupled with the motor 310 using a flywheel coupling 312 that imparts rotational force between the motor 310 and the flywheel 304.

In some instances, the flywheel 304 may be allowed to spin or freewheel relative to the flywheel housing 306, for example by allowing a motor 310 to spin freely and/or allow the flywheel coupling 312 to decouple, as described in further detail below. For example, the MESU assembly 302 may include a motor 310 frame 314 that holds the motor 310 and may allow the motor 310 to be moved, depending on the implementation. Additionally, or alternatively, the MESU assembly 302 may include a coupling lifter 316 or other mechanism that electronically couples and/or decouples the flywheel coupling 312 and/or the motor 310 via the motor frame, as described in the examples below.

A flywheel 304 may include a massive wheel that rotates about a central axis. In the example of FIG. 3A, several metal disks may be used and coupled together, for instance using bolts passing through the disks or clamping the disks together. For example, the flywheel 304 may include disks, rings, or a solid structure.

In the example, ten flywheel disks are shown in FIG. 3A; however, other quantities and configurations are possible and contemplated herein. The thicknesses, sizes, shapes, and quantities of the disks or plates may vary. For instance, the number of disks can be varied to adjust the amount of energy storage of a mechanical-energy storage unit where additional disks provide additional storage for a minimum in additional cost and complexity without correspondingly increasing a probability of structural failure. The disks may be solid plates, have various perforations (e.g., for bolts or a hub), be circular or other shapes, or have other configurations. Ideally, the disks are symmetrical or otherwise balanced to reduce vibrations when the flywheel 304 is spinning.

Depending on the implementation, the flywheel 304 may be constructed from aluminum, steel, concrete, composite, another material, or a combination thereof. For example, a set of steel flywheel plates or disks coupled together, each of which may be a quarter inch, half inch, inch, or other dimension thick. Other implementations, such as a combination of aluminum and composite (e.g., carbon fiber, etc.) are described in further detail below. In some implementations, the disks may include or be reinforced using other materials, such as Kevlar®, fiberglass, or carbon fiber, as described elsewhere herein.

The flywheel 304 may have various dimensions that are based on material strengths of the flywheel 304, desired rotational speeds, and/or desired storage capacities. For example, in order to improve manufacturability, decrease danger of material failure, allow the flywheel 304 to be placed at residences or other small-scale applications, the diameter of the flywheel 304 may range between 6 inches to 36 inches, although other sizes are possible. For example, a flywheel 304 may have a diameter of approximately 25 inches and a thickness of 5-12 inches. As noted elsewhere herein, increasing the quantity of disks may increase an energy storage capacity without increasing rotational speeds.

Although many other implementations are possible and contemplated herein, the flywheel 304 may have weights ranging from 100-1500 pounds, spin at 5,000-25,000 RPM, and have storage capacities of 3-15 kWh, depending on their sizes and materials. For example, by increasing the diameter or quantity of plates, the flywheel energy capacity may be increased to 15-500 kWh. These and other examples provided herein are meant as non-limiting examples and various sizes, materials, configurations, and storage capacities are possible and contemplated.

Various radiuses and rotational velocities may be used to address radial and circumferential stresses. For instance, decreasing diameters may decrease radial stresses but also decrease angular momentum. As material strengths increase, rotational speeds may be increased to correspondingly increase energy storage. As noted elsewhere herein, the RPM of the flywheel 304 may be monitored by a control unit (e.g., a flywheel controller 254) based on motor 310 speed or one or more sensors, so that the control unit can determine a current energy storage as well as keep the rotation within a target, efficient, or safe speed.

In some implementations, the flywheel 304 may have an aperture through its center where a hub and/or axil may be placed; although no through-hub is necessary. The hub may include a cylinder coupled to a rod like axil, which, in turn, is coupled with the flywheel coupler 312 or directly coupled with a motor 310, gear, bearing assembly, flywheel bearing 308, or otherwise. The hub may be bolted, glued, welded, or pressure fit to the plates. For instance, during assembly, the hub and plates may be placed together expanded to differing degrees based on temperature or expansion ratios and, when allowed to equalize in temperature, shrink to create tension and gripping force. The disks may be disks or rings around the hub or may be solid at a center and otherwise coupled with the axil.

Returning to FIGS. 3A and 3B, a MESU assembly 302 may include a motor 310 that may be coupled with the flywheel(s) 304, for example, at a central axis, hub, or axil, by a flywheel coupling 312. The motor 310 may be housed in a motor housing, a rotor of the motor 310 may be located at the central axis and coupled with the flywheel coupling 312 to rotate with the flywheel 304, although other implementations, such as where belts, gears, pulleys, or other devices for coupling the motor 310 to the flywheel 304 may be used. The motor 310 may serve as a motor 310 to drive the flywheel 304 and/or a generator to receive energy therefrom.

In some implementations, the mechanical-energy storage unit assembly 302 may include or be coupled with a motor 310, which may be a generator and a motor, and which may spin up the flywheel 304 to add energy and receive energy from the flywheel 304 to send energy to an output. The motor 310 may have various configurations and sizes depending on the quantity or total mass of the flywheels 304, a target rotational velocity of the flywheels 304 or motor 310, a target efficiency, a weight rating, or other implementations. The motor 310 may be coupled with various other electronics, such as an electronic control unit that measures the electrical input or output, rotational velocity of the motor 310, health of the system, position of the flywheel coupling 312, position of the lifter 316, or other statuses. The electronic control unit may cause electrical current from an external source to be input into the flywheel 304 via the motor 310 or output via the motor 310. The motor 310 may also include or be coupled to various other electronics, such as inverters, alternating current converters, transformers, or other electrical devices.

Alternating current motors or direct current motors may be used, for example, the motor 310 may include a permanent magnet motor 310 or, in order to allow the motor 310 to freely spin, the motor 310 may be an induction motor 310 that allows the motor 310 to freely spin when current is not being applied or received, so that the flywheel 304 can freely spin (e.g., where the flywheel coupling 312 is not decouplable). Other types and configurations of motors are possible and contemplated.

As illustrated in the examples of FIGS. 3A and 3B, a motor 310 may be mounted to a flywheel housing 306 using a motor 310 frame 314, which may hold the motor 310 to align the axis of rotation of its rotor with the axil of the flywheel 304. In some implementations, the motor 310 frame 314 may be mounted directly to the flywheel housing 306 (e.g., as shown in FIG. 3B) or it may be mounted via a coupling lifter 316 (e.g., as shown in FIG. 3A) that may move the flywheel coupling 312 (e.g., a motor component) and/or motor 310 to decouple it/them from flywheel 304. For instance, a motor 310 assembly may include a frame 314, motor 310, coupling lifter 316, and/or other components that support the motor 310 and/or flywheel coupling 312.

The flywheel 304 may be housed in a flywheel housing 306, which may be a steel, aluminum, glass, plastic, composite or other housing for providing support to the flywheel(s) 304. For instance, the flywheel housing 306 may include a metal (e.g., aluminum or steel) plate on the top of the flywheel 304, a metal plate on the bottom of the flywheel 304, various reinforcing members, and housing supports for coupling the top and bottom plates. In some implementations, the top metal plate, or other components of the flywheel housing 306, which is near moving magnets (e.g., of the motor 310, flywheel coupling 312, or flywheel bearing 308) may be constructed from plexiglass or another non-conductive material to reduce induced eddy currents and associated inefficiencies.

The MESU assembly 302 may include a flywheel bearing 308 integrated with or coupled with the flywheel housing 306 and providing vertical and/or horizontal support to the flywheel 304. Depending on the implementation, the flywheel bearing 308 may include fluid, magnetic levitation, ball bearings (e.g., ceramic or ceramic hybrid), Teflon®, and/or other bearings. For instance, the flywheel bearing 308 may use a first type of bearing (e.g., ball bearings) horizontally and a second type of bearing (e.g., magnetic levitation) vertically. In other implementations, the flywheel bearing 308 may be completely based on magnetic levitation. The quantity, type, and spacing of magnets in either side of a magnetic levitation bearing may be based on a total mass of the flywheel(s) 304 and/or other spinning structure.

As illustrated in example FIG. 3B, the MESU assembly 302 may support a supercapacitor 324 or a chemical battery that couples with the motor 310 and covers temporary high-current needs in order to start or the motor 310/flywheel 304 moving or stop it. The supercapacitor 324 may include sensors and/or may otherwise communicate with the controller.

As illustrated in example of FIG. 3B, the MESU may include a computer housing 326, which may support a flywheel controller or CNS (e.g., the CNS 412 described below), an inverter, or various other components. For instance, the CNS may communicate with an inverter, motor 310, sensors, or various other components to detect statuses, events, faults, etc., as described throughout this disclosure.

Figure 4A:
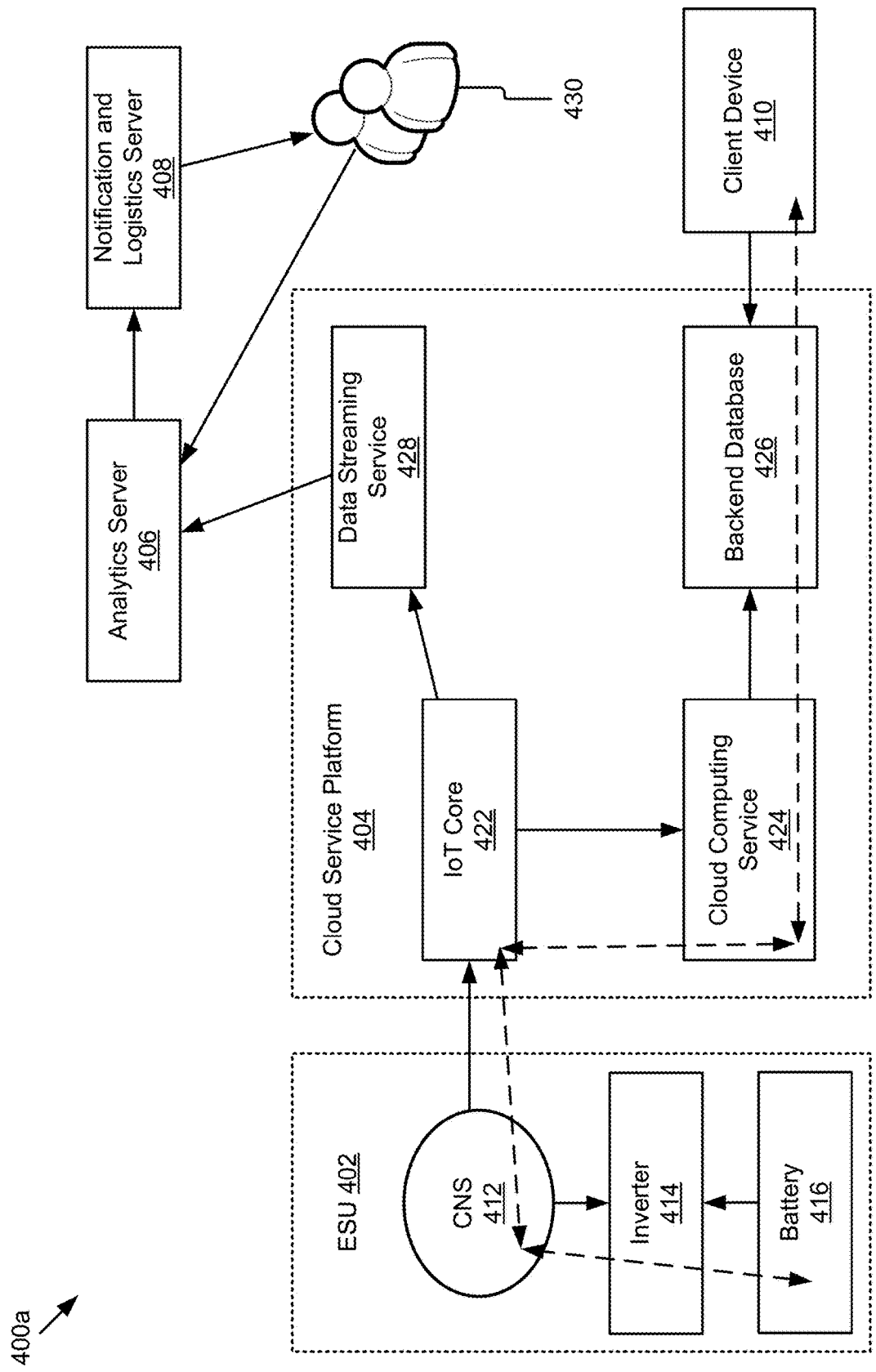
FIGS. 4A and 4B illustrate example network configurations of components for monitoring, analyzing, and addressing faults across one or more energy storage devices.

FIG. 4A illustrates an example network configuration 400a of components for monitoring, analyzing, and addressing faults across one or more energy storage devices. In the illustrated example, the example configuration 400a may include a local energy storage unit 402, a cloud service platform 404, and other components, such as a cloud analytics service 406 (e.g., Datadog™), a notification and logistics server 408 (e.g., Opsgenie™), a mobile client device 410, and other devices. Although certain example services are illustrated as using various third-party applications and being executed on separate devices (e.g., a local device 402, a first server(s) 404, a second server(s) 406, etc.), other devices, configurations, and communications are possible and contemplated. As an example, the cloud service platform 404, analytics server 406, and notification and logistics server 408 may represent examples of the CDR server(s) 116.

Depending on the implementation, the CNS 412 or CDR server(s) 116 (e.g., the IoT core 422, cloud computing service 424, analytics server 406, CDR management 466, or other operations, services, or components) may differentiate between normal or non-fault events and those events that include faults. For instance, as described in further detail elsewhere in this application, the CNS 412 or CDR server(s) 116 may compare event data to rules, thresholds, monitors, or other logic to detect anomalies or anomalies events or data that falls outside of defined normal ranges.

Furthermore, as described below and in reference to FIG. 4B, 5, 6, and others herein, rules, thresholds, actions, and other values may be manually or automatically defined in a database against which events or faults may be compared in order to classify or process the associated event data. For example, events may be automatically classified based on defined fields associated with each type of event and/or values thereof to determine whether a fault is associated with a potential automated response or action, with a potential harm, or other details, such as urgency of repairs, specific repair personnel, etc.

As illustrated in the example, the local energy storage unit 402 (also referred to herein as an ESU 402 or energy station) may include a mechanical and/or chemical battery 416 (e.g., a lithium-ion battery, a flywheel, etc.), an inverter 414, and a central nervous system 412 or controller. For example, the ESU 402 may be an example implementation of a MESU 150, node 140, and/or MESU assembly 302 described elsewhere herein. In some implementations, the ESU 402 may include a central nervous system (CNS) 412 communicatively coupled with an inverter 414 and a battery 416 (e.g., via the inverter 414). For instance, the battery 416 may include a chemical battery, mechanical battery (e.g., a flywheel), and/or capacitor.

The ESUs 402 may be divided into groups or clusters based on their geographical area, an electrical grid (e.g., connected to a common sub-station), a neighborhood, or another defined division. The ESUs 402 may be located one at each location or multiple at a single location. The technologies described herein may apply to individual ESUs 402, clusters/groups of ESUs 402, or an entire network. For instance, analytics may be generated for a cluster based on data from a cluster to detect anomalous data of a single ESU 402 versus the other ESUs 402 in a cluster, anomalous data across multiple ESUs 402, etc., as described above. The analysis of what is anomalous may be based on a deviation in the data over a group or over a time period (e.g., 5 minutes, an hour, etc.) or versus defined thresholds.

The battery 416 may send telemetry and other data (e.g., sensor data indicating statuses of the battery 416) and/or current to an inverter 414, which may be communicatively coupled with the CNS 412, which include data processing capabilities, such as the computing device described above. The CNS 412 may read safety registers and receive other data from the inverter 414, control electrical output or input (e.g., to an external load or energy source such as a residence, the electrical grid, etc.) of the battery 416 via the inverter 414, etc. Accordingly, data, such as a battery temperature, may be transmitted from the battery 416 to the inverter 414 and then to the CNS 412 where it is processed, as described in further detail below. For instance, the CNS 412 may determine an excessive heat fault in the battery 416 and immediately instruct the battery 416 to shut down, vent, or otherwise take remedial action. The CNS 412 may, additionally or alternatively, generate and transmit data to the cloud service 404, which may include telemetry, faults, and other identifying or status information via MQTT (Message Queuing Telemetry Transport).

The cloud service platform 404 may include various software services executed on one or more servers, which may be located remotely from the ESU 402. For instance, an Internet-of-Things core 422 executed on AWS (Amazon Web Services™), Microsoft Assure™, IMB Cloud™, or another web services platform, may receive the telemetry and fault data/message from the ESU 402, and it may apply message routing rules to send a message, based on the data, to a cloud computing service 424 (e.g., AWS Lambda™), which may include a compute cloud service provided by a third-party that may process the message, store the data/message, and store it in a backend database 426. For instance, the IoT core 422 may determine a topic based on the type of event, such as whether it relates to temperature, flywheel speed, charge state, network connection status, or other event types and use those event types or topics to route data to a backend database 426, data streaming service 428, analytics server 406, and/or locations on these components.

The database 426 and/or messages may be accessed by a client computing device 410, such as a smartphone application (e.g., on the client device 410) to provide real-time notifications and data indicating the health or status of the local ESU 402. For example, the CNS 412 may send a message to the cloud service platform 404 including data identifying and describing the battery 416, inverter 414, sensors, and/or other devices, including events or faults; the cloud service platform 404 may process the data (e.g., to add flags or formatting for storage and use by another device) received from the CNS 412 according to a defined set of data-processing rules; and a mobile application may access the data and display it in a graphical user interface including, for example, an indication of events, faults, or alerts to the user. In some implementations, the mobile application may additionally or alternatively indicate alert severity levels, remedial actions, repair status, or other data, as described in further detail below.

In some implementations, the cloud service platform 404 may apply message routing rules (e.g., based on a topic, event type, ESU 402 location, or other context data) to the data to route the data through a data streaming service 428 (e.g., AWS Kinesis™) to a cloud analytics service/server 406 (e.g., Datadog™), which may execute defined rules and routines for analyzing, routing, aggregating, and displaying data. For instance, the cloud service platform 404 may determine that the data includes telemetry and/or fault data and may, accordingly, push it (e.g., via AWS Kinesis™) to the analytics server 406. It should be further noted that the divisions and distributions of operations may be on different devices, the same devices, as illustrated, or different from that illustrated. As described in further detail elsewhere herein, routing, processing, storage, and/or analysis of data may be performed based on a set of logical rules executed on one or multiple devices.

In some implementations, the analytics server 406 may process the data, potentially in conjunction with other data or faults for the same or additional ESUs 402, to determine severity level, remediation actions, etc., and may provide analytics to administrators via a web interface (e.g., as described below) and/or to customers on their mobile applications (e.g., by sending the data to the database at 404 or allowing access via the analytics server 406). The processing of the data to determine fault levels and other analysis and operations are described in further detail throughout this application.

In some implementations, as described in further detail below, the analytics server 406 may execute code, routines, or rules that analyze the data from the ESU(s) 402 and automatically perform actions. For instance, as described below, the analytics server 406 may triage the faults to determine a severity level and, based on the fault, severity level, and/or other information, transmit a message to a notification and logistics server 408. The notification server 408 may determine a party to contact based on the message and may then send a message (e.g., SMS message, email, etc.) to a client computing device 430 of a defined party, such as a repair person or engineer. For instance, if a certain type of repair in a certain geographic region (with a certain priority level, etc.) is identified, the notification server 408 may automatically dispatch a corresponding repair truck. In another implementation, if an emergency event is identified in the message (e.g., a battery fire), the notification server 408 may automatically request that emergency fire and/or medical services be sent to the location of the ESU 402, which may be identified in the message). For example, the notification service 408 may send SMS, MMS, or other text messages, phone calls, push messages, or other types of communications to client devices 410 associated with repair personal, local emergency services, or other administrators (e.g., a customer, a customer-service team, a subdivision manager, etc., as identified in notification rules on the notification server 408).

In some implementations, the analytics server 406 may compare data received from a first ESU 402 with data received from one or more additional ESUs 402 in a group, cluster, or region to identify problems over a larger network, issue remedies that maintain stability across the group of ESU 402 or grid, and/or identify outliers. Accordingly, larger-scale faults can be detected, anomalous or mis-performing devices can be identified, and remedies can be proactively dispatched.

In some implementations, the notified stakeholders (e.g., repair teams, administrators, etc.) may access the analytics server 406 to view the telemetry or fault data to further assess its severity, for example, the analytics server 406 and notification server 408 may include a link in the notification to the corresponding data to allow rapid access by the stakeholder(s).

In some implementations, the analytics server 406 may receive (e.g., from the stakeholder) a user input correcting or modifying the severity level, fault, or remedy generated by the logic executed on the analytics server 406. In some implementations, the analytics server 406 may use the feedback to train machine-learning models (e.g., various supervised or un-supervised learning models) or weights for determining future triage, severity, fault, or alert thresholds, which may improve false positive or false negative rates.

It should be noted that other architectures and features are possible and contemplated. For instance, the data may be processed on one or more different first- or third-party servers, on a CNS 412, etc.

As illustrated in FIG. 4A, a dashed line illustrates an example data path illustrating an analysis process for data generated by an event. It should be noted that the data, processing, and corresponding devices are provided by way of example and that others are possible and contemplated herein. For instance, a sensor coupled with the battery 416 may include an accelerometer that senses vibrations from a flywheel in the ESU 402. The accelerometer may be communicatively coupled with the CNS 412 (directly or via the inverter 414), for example, to store or send data thereto. For example, the accelerometer data may be stored on a data storage device of the CNS 412 and/or the CNS 412 may stream and/or process the data.

In some implementations, the CNS 412 may use IoT standards, such as MQTT encrypted using TLS (transport layer security) to stream telemetry, etc., data, such as including data from the accelerometer or a derivative thereof, to an external server or computing devices, such as the cloud service platform 404. An IoT core 422 may, for example, route the accelerometer data based on its context to an analysis server, such as the cloud computing service 424. For example, the IoT core 422 may route the data to a process in the cloud computing service 424, which may process the data to store it on a backend database 426.

In some instances, where the accelerometer data includes an event, for example, exceeding a defined threshold. It may be classified or tagged as a fault by the CNS 412, IoT core 422, or another component. In such instances, it may be routed or streamed to an analytics service or server 406 for further processing, as described in further detail below.

Accordingly, the accelerometer data may be processed locally on the ESU 402, stored on a remote server, and/or routed directly to an analytics service or server 406 to detect faults, classify alerts, and issue corresponding responses. Thus, in some implementations, the data may be efficiently monitored, and events may be detected in a way that combines local capabilities and remote resources to allow continuous event detection and response.

Figure 4B:
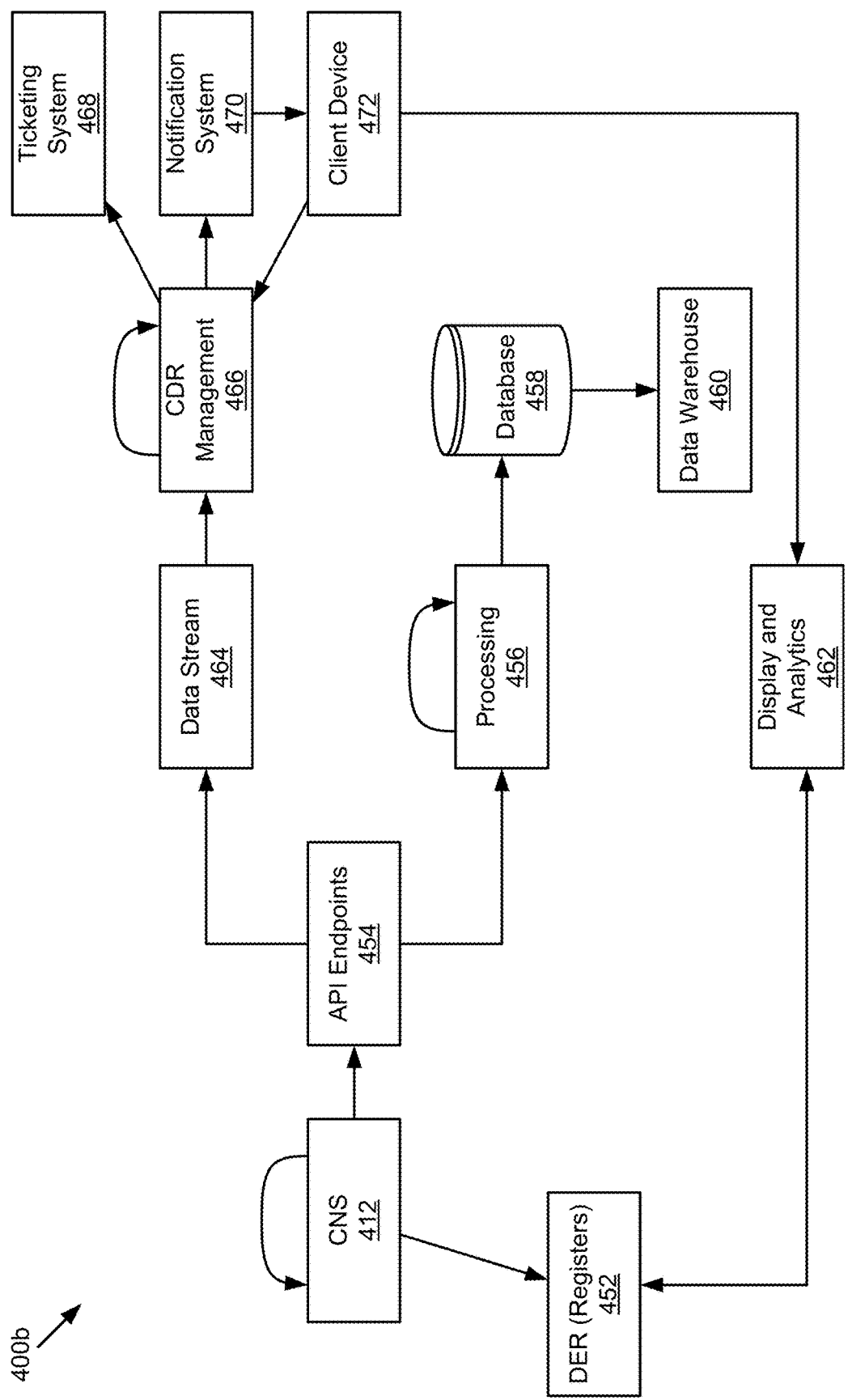

FIG. 4B illustrates another example network configuration 400b of components for monitoring, analyzing, and addressing faults across one or more energy storage devices. Depending on the implementation, the example configuration 400b may be used in addition to or in the alternative to the configuration 400a. In some implementations, one or more devices, messages, or operations may be exchanged between the configurations 400a and 400b. For instance, aspects of the example configuration 400b may be used with aspects of the configuration 400b and vice versa. Accordingly, the example configuration 400b provides additional or alternative details to the configuration 400a described in reference to 400a. As an example, the API endpoints 454, CDR management service 466, ticketing system 468, notification system 470, etc., may represent examples of the CDR server(s) 116.

In some implementations, the CNS 412 may access device registers 452, such as DER (distributed energy resource) device registers, that receive data from various sources on one or more ESUs 402, such as physical or digital sensors of a battery 416 or inverter 414 (not shown in FIG. 4B). A DER device may additionally or alternatively include any device that uses, produces, or stores energy or devices that senses associated parameters, such as a thermometer or thermostat, battery controller, flywheel controller, accelerometer, HVAC device, or many other devices. For example, the CNS 412 may read or write to registers via a controller area network (e.g., RS485) to communicate with devices and sensors, process and compare data locally, etc. The CNS 412 may perform continuous local processing of the DER telemetry and may, using the telemetry data, classify events into faults and report the faults, for example, to an external CDR server(s) 116 for further storage, analysis, processing, reporting, or other actions.

In some implementations, where the CNS 412 detects a fault and determines that the fault includes a defined local response, it may perform one or more automated local actions to attempt to locally resolve the fault. Depending on the fault, automated response, and effect thereof, the fault data may also be routed through to an analysis server or CDR management device 466, as described elsewhere herein.

As discussed above, the CNS 412 may transmit telemetry or fault data (e.g., using TLS-encrypted MQTT protocol), for example, which may be routed through application programming interface (API) endpoints to one or more other services, for example, based on the types of faults/events/telemetry data. The API endpoints 454 may also route or transmit encrypted (e.g., using TLS) data to various other services and/or devices. For example, the API endpoints 454 may send a data stream 464 to a CDR management service 466 (e.g., executed on a CDR server(s) 116 or analysis server).

The CDR management server 466 may decrypt the data and perform continuous telemetry and fault processing to identify anomalous activity and alerts. Depending on the identified alerts, etc., the CDR management service may send data to a ticketing system 468, which performs ticketing automation. For instance, it may process an alert and/or other event data (e.g., location, type, etc.) through a decision tree or other logic to automatically create one or more service or response tickets that may be monitored by stakeholders, sent via a notification system 470, or otherwise processed, as described elsewhere herein.

The CDR management service 466 may send alerts and/or ticket information to the notification system 470, which identifies stakeholders, based on the tickets, alerts, or associated data. For instance, if an alert indicates a low severity vibration from a flywheel in a define geographical region, the CDR management service 466 may automatically generate a ticket, assign a flywheel technician, and send a notification to the technician indicating location, severity, alert type, etc., data associated with the alert. For instance, the notification system 470 may automatically determine notification preferences (e.g., e-mail, SMS or MMS message, push notification, etc.) and a client device 472 (e.g., a personal computer, smartphone, wearable, etc., associated with the technician or where a user application 172 is executed) for the notification. In some implementations, alerts, notifications, or associated data may additionally or alternatively be sent to engineers, product designers, administrators, emergency responders, residents, and/or other users/stakeholders.

In some implementations, the stakeholders, such as support engineers, may review the alert and provide user input (e.g., via the user application 172) regarding the alerts. For instance, they may indicate the status of a response, or they may modify the response. In some implementations, the support engineer(s) may modify a severity level, manually triage alerts, or provide other inputs.

In some implementations, the engineer responses may provide a training dataset that may be used to train and/or test a supervised-learning machine learning model or other weights or thresholds. For example, as feedback is fed into the training algorithms used by the CDR management service 466 to adjust the weights or thresholds used to generate alerts from faults or events, as described in further detail elsewhere herein.

In some implementations, the API endpoints 454 may send the telemetry, fault, event, or other encrypted or non-encrypted data for processing. For example, one or more processors 456 may continuously process telemetry and fault data for access, analysis, display, storage, etc., of the data via web or mobile-application user interfaces. For instance, the processing 456 may be of various MQTT message types, such as telemetry, debug, or fault data, although other types are possible and contemplated herein.

In some implementations, after processing 456, various types of data may be stored in a database 458 and/or in a data warehouse 460 (e.g., for longer term storage), which allows the data to be analyzed, viewed, or otherwise retrieved.

The feedback from a client device at 472 may be stored or displayed, at 462, in a display and analytics service, for example, along with data from the DER registers and other event or other data from an ESU 402 or node 140 (e.g., as reported to the databases 458 or 460 by the CNS 412).

Accordingly, the example continuous detection and response architectures 400a and 400b illustrated and described in reference to FIGS. 4A and 4B may provide an efficient way to detect, route, process, and respond to various events. For example, the example architectures 400a and 400b allow a multi-stage categorization or triage of events, which may result in a local response and/or elevation to further routing, categorization, and response.

Figure 5:
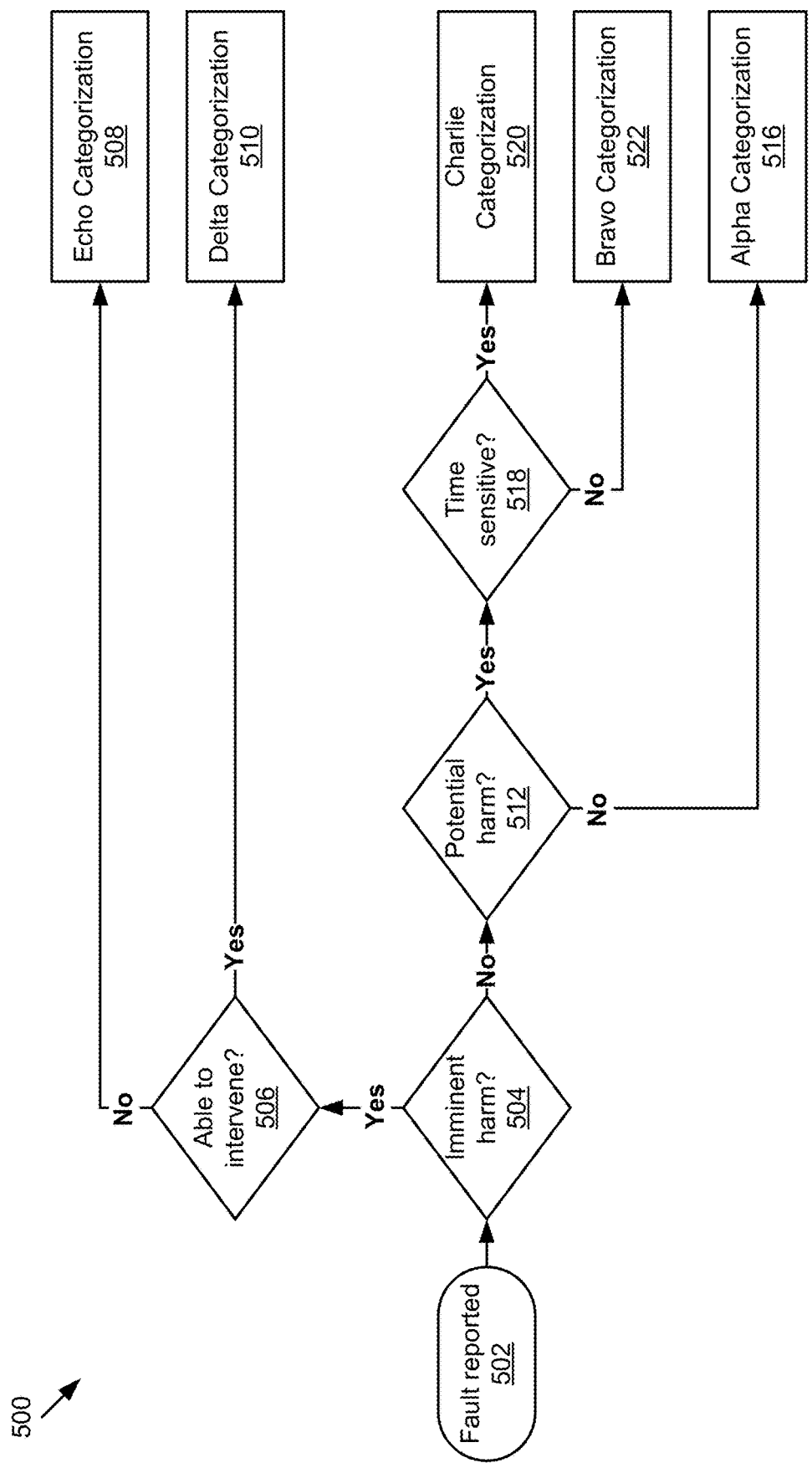
FIG. 5 is an example flowchart depicting a fault categorization decision tree for classifying faults.

FIG. 5 is an example flowchart depicting a fault categorization decision tree 500 for classifying faults. The decision tree 500 could be executed on a CNS 412, cloud server, analytics server 406, and/or another device, depending on the implementation. The decision tree 500 may be used to classify faults, for example, into alerts with defined severity levels or classifications. It should be noted that, although it is described in reference to alert severity levels, it may be used with other classifications, such as types of faults, types of responses, etc.

For example, for the purposes of the description of FIG. 5 and other figures herein, a fault may include a pre-defined definition of an abnormality relating to the ESU 402, a cluster of ESUs 402, or another system, an active fault may be an actively detected abnormality relating to the ESU 402 or another system, an alert may be an escalated abnormal event that may use automated local response or that may require external intervention based on the risk to the ESU 402 or another system's safety, and an action maybe a series of steps to escalate, deescalate, and troubleshoot alerts, which may also account for impact to the customer or others' experience.

For example, the system (e.g., an analytics server 406, CNS 412, and/or another device) may receive a notification of a fault (e.g., from a CNS 412 of an ESU 402) at 502. At 504, the system may determine if an event may result in immediate harm, for example, to the ESU 402, for example, based on details of the event/fault (e.g., sensor data, type of sensor, type of event, etc.), values associated with the event (e.g., acceleration values, voltages, temperatures, etc.), and associated parameters. For instance, the system may determine that an event (e.g., a temperature) exceeds a threshold programmed into the system for that type of event (e.g., exceeding 100 degrees), the system may determine that immediate harm is possible and immediately move to the next step.

At 506, if, based on the fault and its parameters, the system determines that imminent harm is possible (e.g., based on a defined fault or threshold levels thereof), the system may determine whether it is able to intervene. For instance, the system may determine whether there are immediate responses defined for the event and/or its values, such as that it could shut down a battery 416, flywheel, or other component to mitigate damage. If the system determines that it is unable to intervene (e.g., based on a type of fault or its level), the fault may be categorized at a highest or "echo" level at 508. Echo may indicate damage control or clean up rather than mitigation. If the system determines that it is able to intervene, it may do so (e.g., by sending a message to the CNS 412 to restart, shut down, spin down, vent, etc.), and may categorize the fault as "delta" level at 510. For example, the delta level may cause a closest repair resource to deescalate the situation. For example, as described above, a ticket may be automatically generated and an associated notification may be sent to a stakeholder's client device indicating the alert, severity level, associated details, and/or recommended responses/remediations.

In some instances, where the system determines that there is no imminent (e.g., within a defined time period) harm to the system at 504, it may determine whether the fault is classified (e.g., in a data table of fault definitions) as potentially resulting in harm at 512. If there is no potential harm (for example, a temporary failure to communicate), it may be classified as a lowest or "alpha" level at 516.

If the system determines that the fault may cause potential harm at 512, it may then determine whether the fault is time sensitive at 518. If a definition or attribute of the fault type indicates that it is time sensitive, the system may classify it under "Charlie" level at 520. For instance, a bad bearing could deteriorate, so the system may determine that elevated bearing/axil temperatures at a certain speed are time sensitive and has potential harm, so it may classify the fault as "charlie" level. If the fault is not time sensitive (e.g., a bad bearing slightly reduces performance), it may be classified as "bravo" level at 522.

Various severity or risk levels to which a fault may be classified may be used and associated with thresholds, weights, values, colors, or alphabetical codes. Various actions, stakeholders, data routing instructions, etc., may be triggered responsive to a fault being classified into a certain category. For instance, the actions may range from monitoring the fault, dispatching repair resources, to notifying emergency services. Accordingly, faults can be quickly and automatically classified, which leads to increased safety that is proactive instead of merely responsive. Similarly, maintenance and repairs can be performed proactively using data from local devices that was not previously available.

Each of the categories may also include sub-categories for types of alerts, such as those relating to software, hardware, chemical batteries, flywheel batteries, etc. Accordingly, using the alert type, severity level, sub categorizations, flags, or other details, the alerts can be routed, responses may be issued, and notifications sent, as described in further detail above.

As an example of an alpha-level alert, the risk may be low, time may not affect the outcome, and there is no direct threat to safety. An example associated action (e.g., used as a response or automatically processed by the system) may include monitoring the alert (e.g., and/or the associated conditions from the ESU 402) and scheduling remediation accordingly.

As an example of a bravo-level alert, the risk may be moderate, the response time may affect the outcome, and there is no direct threat to safety. An example associated action may include priority scheduling of a skill set (e.g., a repair technician having a skill set associated with the alert) to resolve the alert.

As an example of a charlie-level alert, the risk may be high, the response time may affect the outcome, and there is a potential threat to safety. An example associated action may include immediately dispatching medium-level (e.g., tier 3, medium level response/repair personnel) resources with high-level (e.g., tier 4) resources on standby to monitor the situation while the medium-level resources are in route to perform critical de-escalation. For instance, notifications may be sent to each of these parties based on their defined roles.

As an example of a delta-level alert, the risk may be imminent, the response time will affect the outcome, and there is an imminent threat to safety. An example associated action may include immediately dispatching a geographically closest stakeholder and high-level resources; and potentially alerting emergency services, as needed.

As an example of an echo-level alert, the risk may be a potential total loss and property and asset(s) may no longer be recoverable. An example associated action may include notifying emergency services, if they have not already been notified, and notifying one or more executive team member to address the alert and associated incidents.

It should be noted that although certain alerts, alert parameters, and actions are described, others are possible and contemplated herein.

Figure 6:
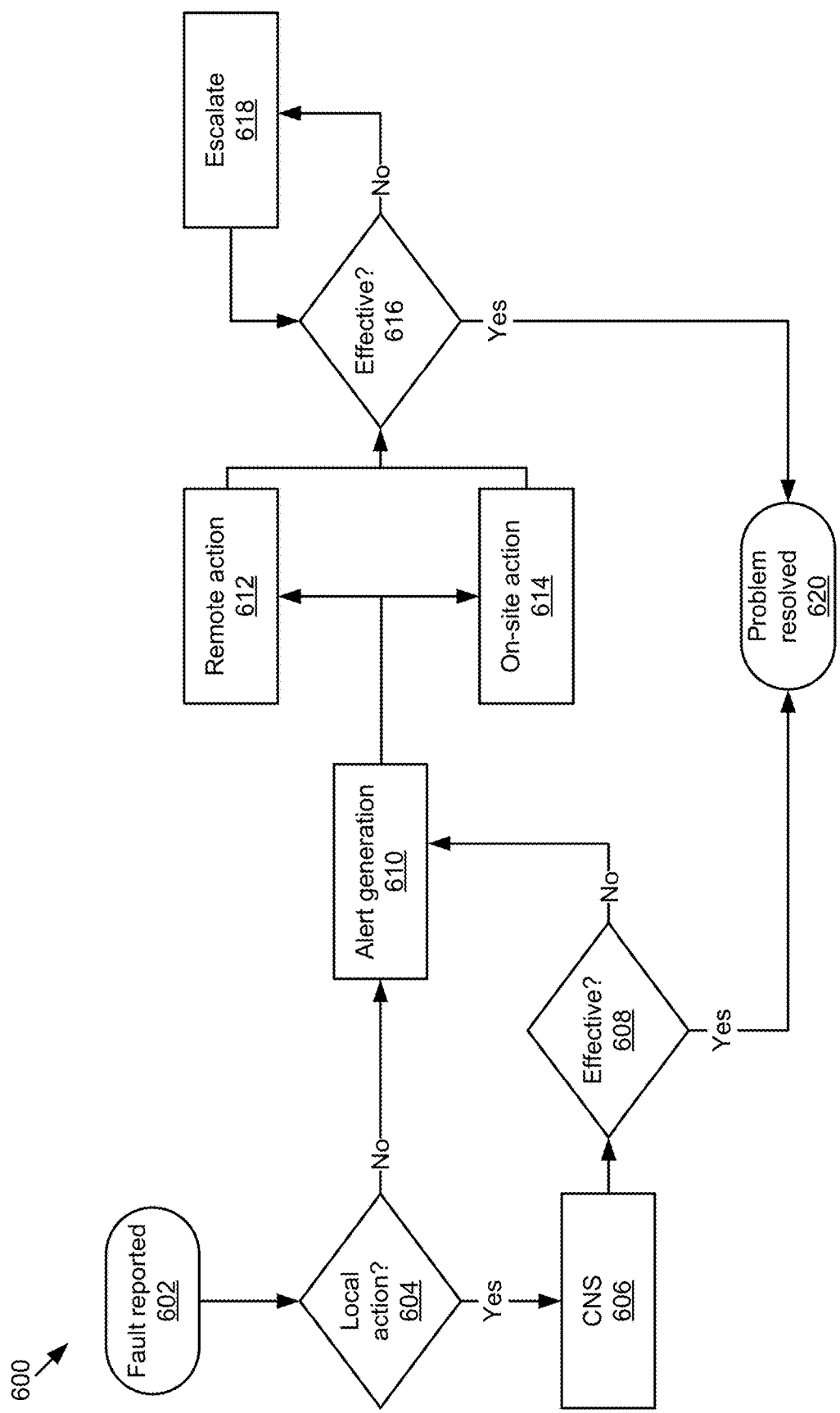
FIG. 6 illustrates a flowchart depicting an example alert and action processing flow.

FIG. 6 illustrates a flowchart depicting an example alert and action processing flow 600, which may indicate, for instance, associated services and devices with actions or other operations.

In some implementations, the method of FIG. 6 may start at 602 where the fault is reported. For instance, local hardware (e.g., the CNS 412 of an ESU 402 at a customer's residence) may generate a fault based on a local event and send it to an analytics system (e.g., the analytics server 406), which may alert or log that fault, as noted above.

At 604, the system may determine whether local action is possible or defined in association with the fault. In some implementations, if local action is possible, at 606, the local hardware may additionally or alternatively take local action, such as spinning down a flywheel, discharging a battery 416, shutting off a current, etc. An example of a fault may include that the battery 416 has a high voltage beyond a defined threshold, or the battery 416 temperature is too high. A fault may be based on multiple criteria (e.g., both voltage and temperature). In some instances, if multiple faults are generated or received at the same time, the system may change the classification of an alert, for example, to indicate a higher severity or priority level.

For example, as noted above, the CNS 412 may receive and/or transmit data describing a status or health of the ESUs 402 periodically, such as every 50 milliseconds (although other rates are possible and contemplated herein), so that the CNS 412, analytics server 406, and/or other systems know, in nearly real time, what is happening at individual ESUs 402. Accordingly, the system may have nearly instantaneous and continuous data for each node, which may be used to quickly determine and address faults. Furthermore, as this data may be timestamped and associated with determined events, machine learning models may be trained to develop predictive models to identify faults before damage is caused or further improve processing accuracy. For instance, while previous methods may have reacted to problems, the data-availability and predictive models may detect and address faults before they develop into more-serious problems that could affect the functioning or safety of the system, or impact customer experience.

At 606, the CNS 412 may address the issue within the system in a closed loop, for example, instead of (or prior to) a human repair person performing a manual intervention. For instance, once the CNS 412 generates a fault, it may determine whether local action is possible (e.g., based on a file indicating defined set of actions respective to each fault or fault combination). For instance, the CNS 412 or analytics server 406 may determine that local action is possible and instruct a local action (e.g., by the CNS 412), such as restarting a device, modifying a state of charge, freewheeling a flywheel, etc.

As an example, if the CNS 412 or CDR server(s) 116 determines that a local action is possible based on received data (e.g., based on a thermometer data or communications from a battery, that a temperature of the battery is too high), the CNS 412 may shut down the battery or perform further diagnostics, power cycle the battery 416, power cycle the inverter 414, push software/firmware updates to various devices, turn battery warmers on or off, or perform other operations that are defined in a fault definition database. As another example, based on data gathered for an event, the system may determine that the event is a fault (e.g., based on a definition in a database), for instance, where voltage drops beyond a defined threshold or is a threshold miss-match of voltage or phase (e.g., where an inverter is matching alternating current frequency of an external power grid), the system may instruct the inverter 416 to dissipate energy, drop/raise voltage, adjust frequency, or perform other defined, automated operations to stabilize the node 140 relative to the grid.

At 608, the system (e.g., CNS 412 or CDR server(s) 116) may determine whether the solution was effective, for example, by pinging the local hardware or waiting for another fault code or other status data.

At 610, if the local action is not available or if it was not effective, then the system (CNS 412 or CDR server(s) 116, as noted above) may determine an alert to indicate whether or not a repair should be performed. In some instances, based on the alert, it may transmit a message to a notification server to dispatch a repair vehicle or have another system or administrator perform an action to deescalate the alert.

For example, if the notification requests that a stakeholder or system perform an action, they may perform a remote action at 612 or an on-site action at 614 (e.g., determined and routed as noted above). For instance, if a response or action is defined as being a remote action, such as adjusting spin rate, restarting a system, monitoring an event, etc., a remote service or technician may perform the remote action. Additionally, or alternatively, a technician may be dispatched to take on-site action, as discussed above.

Based on a fault message, continued monitoring, or administrator/human input, the system may determine whether the remedy was effective at 616. If the remedy was not effective, the system may reclassify the fault/alert to a higher level of severity and perform corresponding actions at 618. Accordingly, the fault may be elevated until it is resolved. On the other hand, if the system determines that the action was effective in remedying the fault, it may update a corresponding ticket to be resolved, temporarily monitored, or otherwise at 620.

Accordingly, in combination with the local data and triaging, the system may self-heal and/or self-diagnose. In some instances, these self-healing actions may include checking for false positives or other error correction, as noted elsewhere herein. For example, the system may detect a voltage spike that exceeds thresholds and classify it as a fault. Based on the voltage spike's parameters (e.g., voltage, value respective to thresholds, duration, etc.), the system may determine to wait to see if additional spikes are detected within a defined time period. If spikes or other faults are detected within the time period, then they may be escalated, but if no additional faults are detected, the system may mark the fault as resolved.

Accordingly, the system may proactively and accurately detect faults that could be dangerous or require immediate action, such as a thermal runaway event, which allows the system to dispatch repair and/or emergency personnel. While previous systems did not have accurate or up-to-date data about a local system, such as a battery 416 or flywheel at a residence, the present technology allows dispatched repair and/or emergency personnel to be prepared for specific circumstances of a fault as well as answer it more quickly. Because the system rapidly self-diagnoses, self-heals (or performs mitigation measures), resources are more efficiently used, alerts are responded to more quickly, and safety is increased. Thus, the present technology is more proactive, faster, and sensitive than previous systems.

Figure 7A:
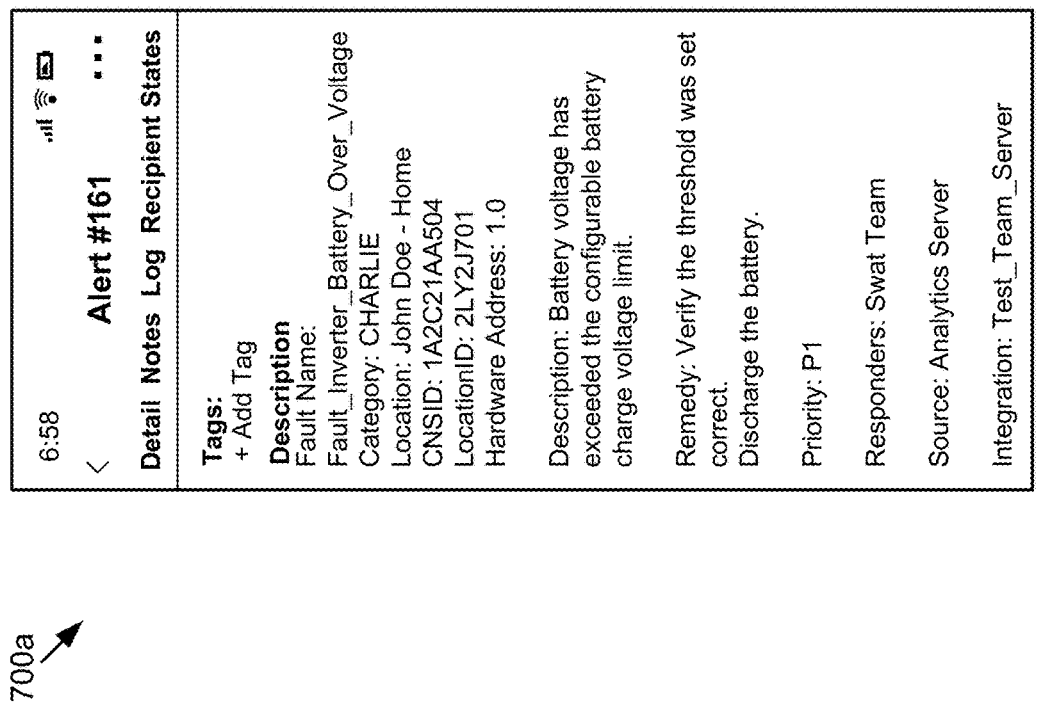
FIGS. 7A-7C illustrate example graphical user interfaces showing example alerts and associated event details.

FIG. 7A illustrates an example graphical user interface 700a that may be displayed by a mobile application showing an example alert. For example, the interface of FIG. 7A may be displayed on a repair technician's mobile phone, although other implementations are possible. As illustrated, a fault may include a battery 416 high voltage event where a battery 416 has exceeded a configurable voltage limit, for example, as reported by an inverter 414 coupled with the battery 416. The notification of the alert may also show the fault name, category/severity, location name, location ID, proposed automatic and/or manual remedies, priority level, timestamp, assigned responders, source, and other data.

Figure 7B:
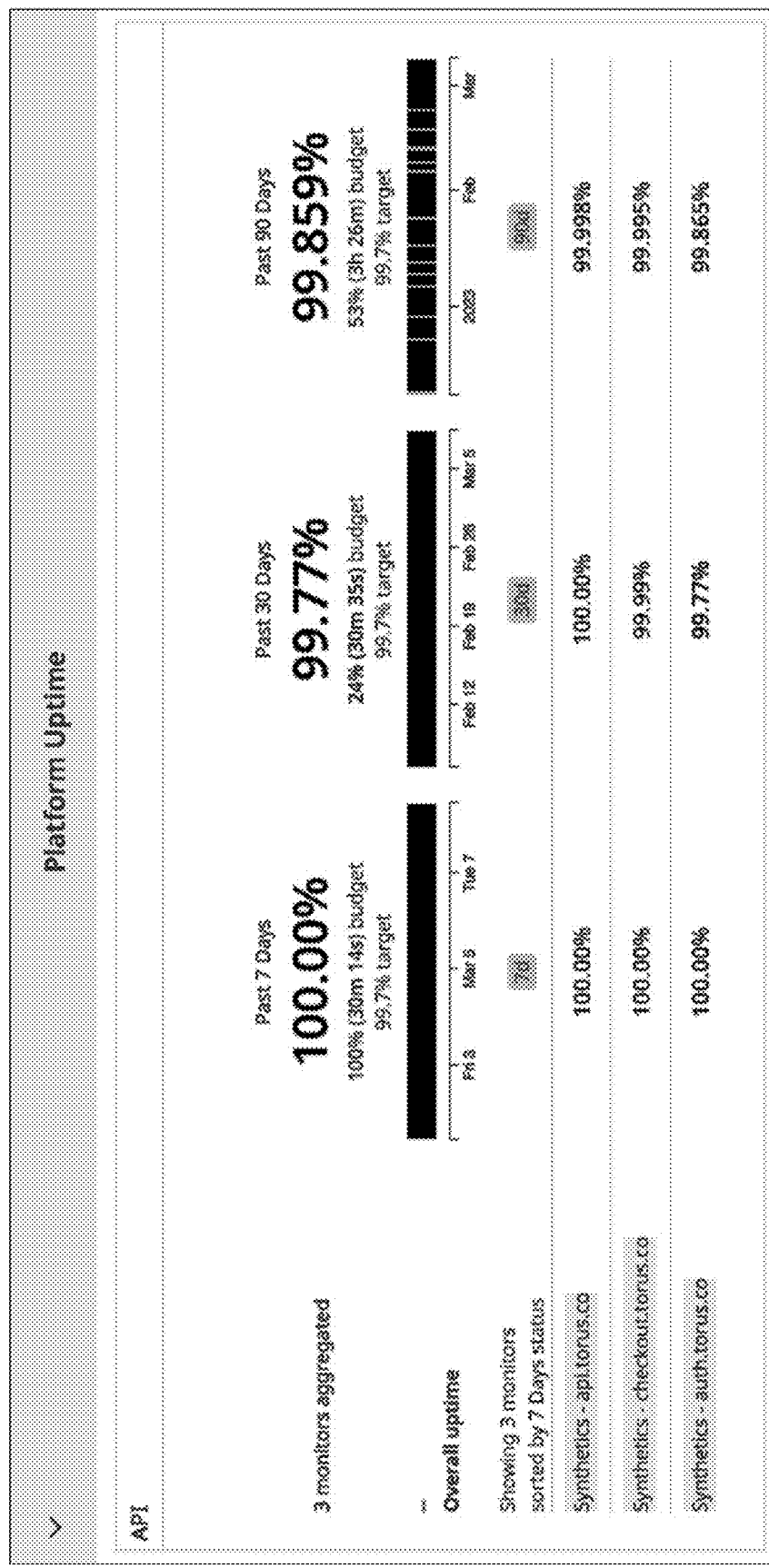

FIG. 7B illustrates an example graphical user interface 700b showing statistics for one or more ESUs 402 over various time periods. For instance, the system may use the detected faults to automatically generate analytics for various statuses or faults, etc. For instance, the interface 700a illustrated in FIG. 7B includes graphical elements (text, graphs, or other graphics) indicating downtime/uptime, percentages, and other details over various time periods. In the illustrated example, the data is shown aggregated from multiple ESUs 402 and may be totaled or averaged across the group.

Figure 7C:
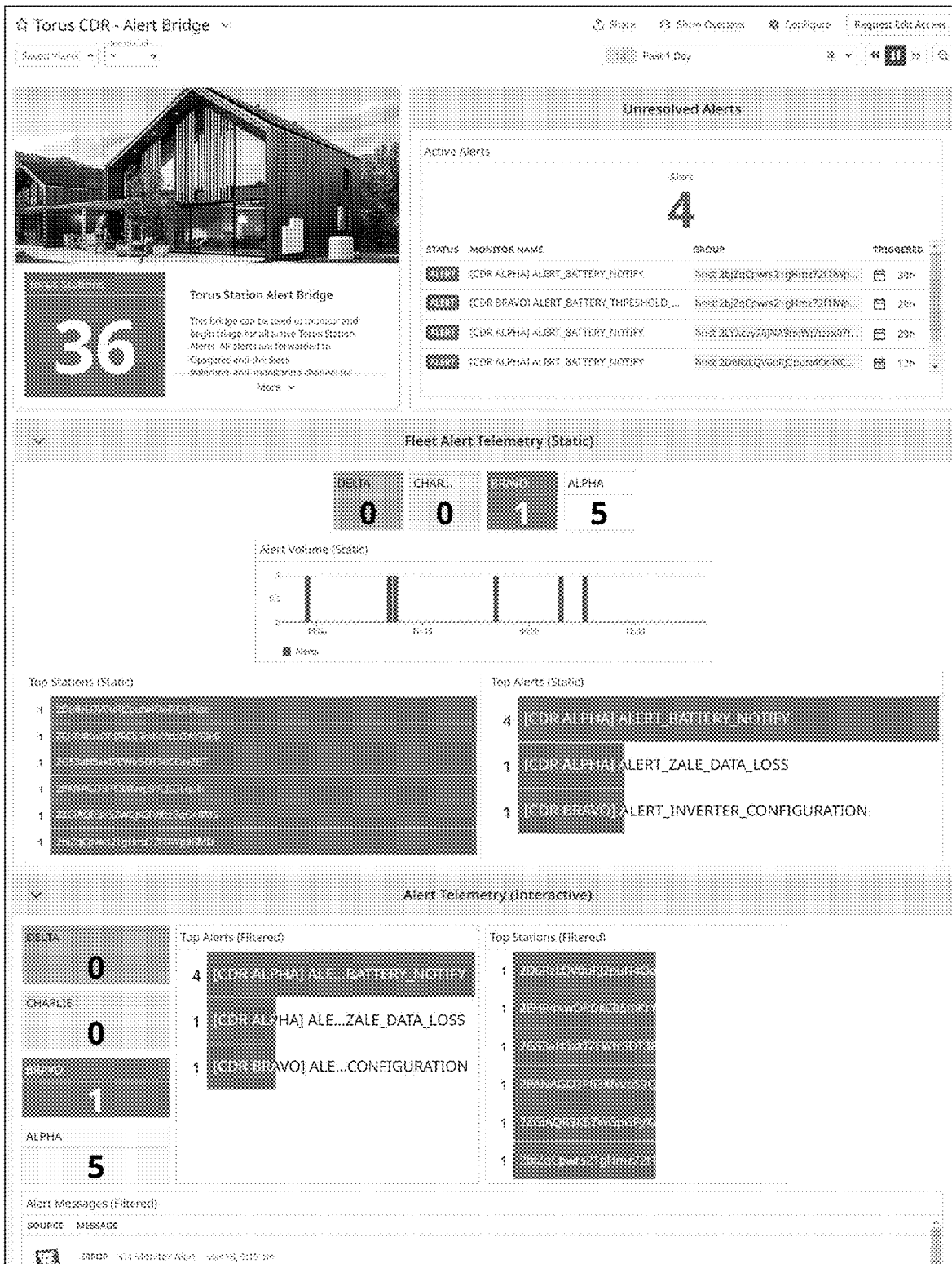

FIG. 7C illustrates an example graphical user interface 700c, which shows an alert bridge in which various alert data may be displayed to a stakeholder. For instance, the interface shows the number of nodes being monitored (e.g., in a defined cluster), a quantity and timing of resolved and unresolved alerts, alert telemetry data, and other data. For instance, graphs may be shown illustrating total alerts and their types and timing, and other data over a defined time period or group of nodes/ESUs 402.

Figure 8A:
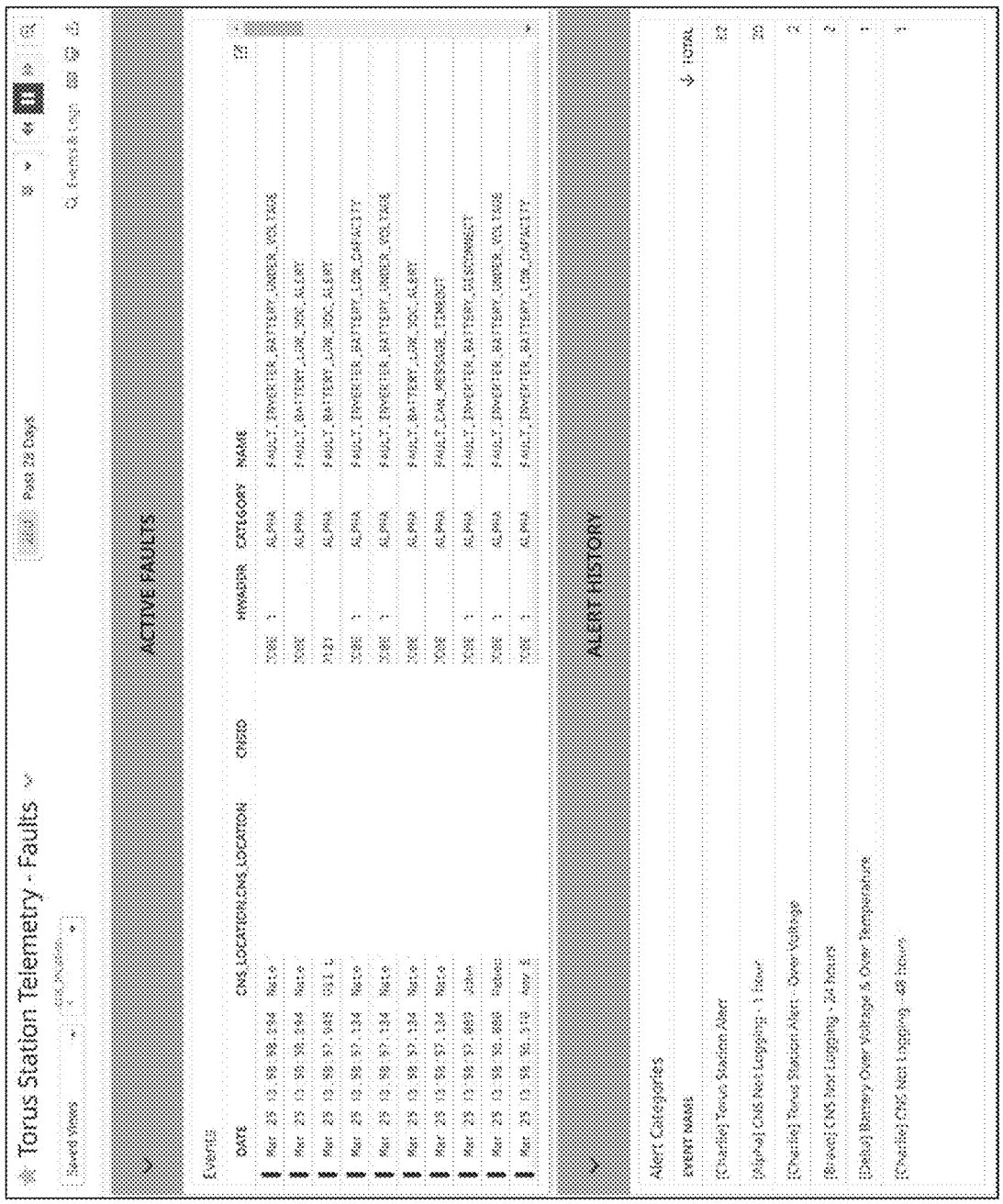
Figure 8B:
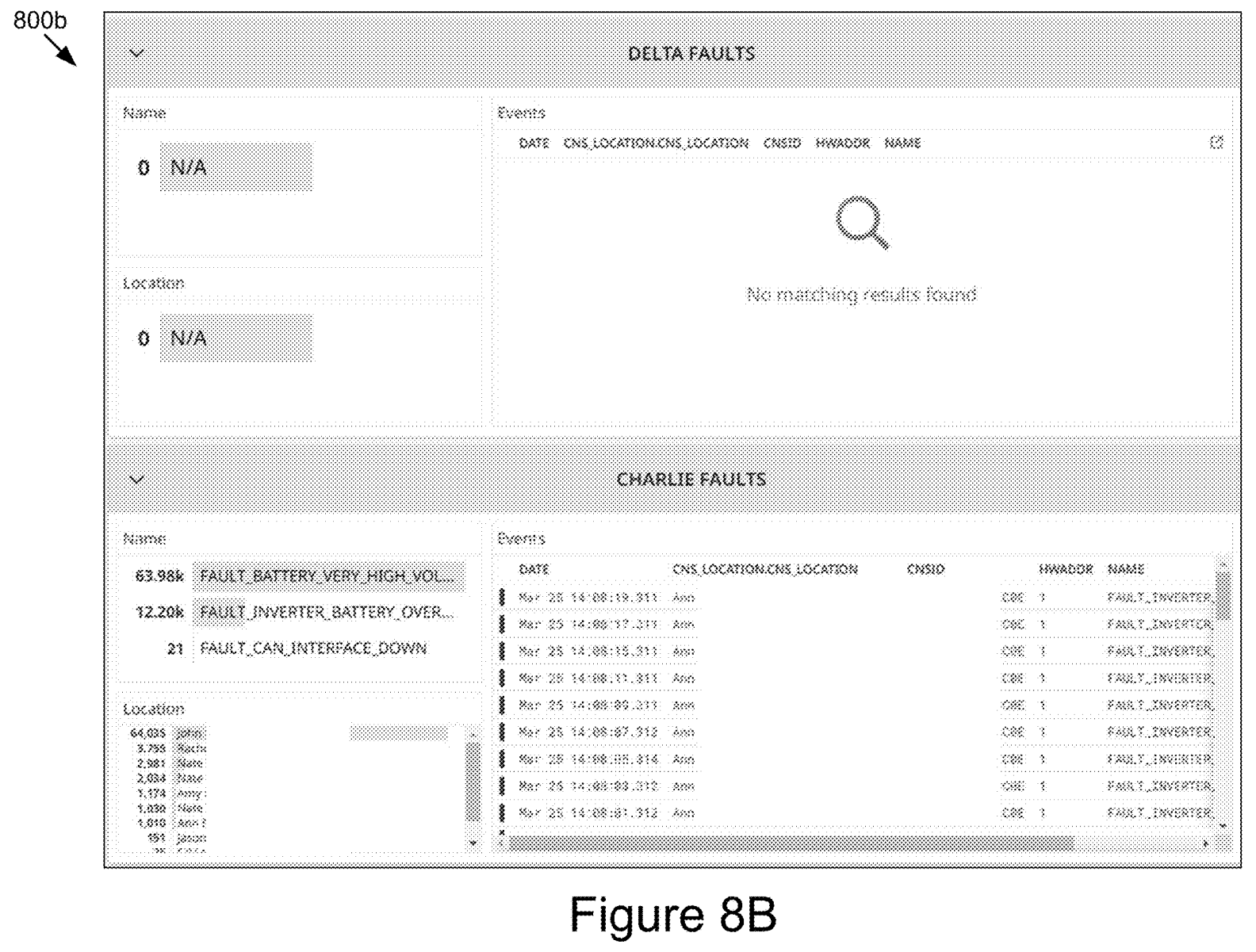
Figure 8C:
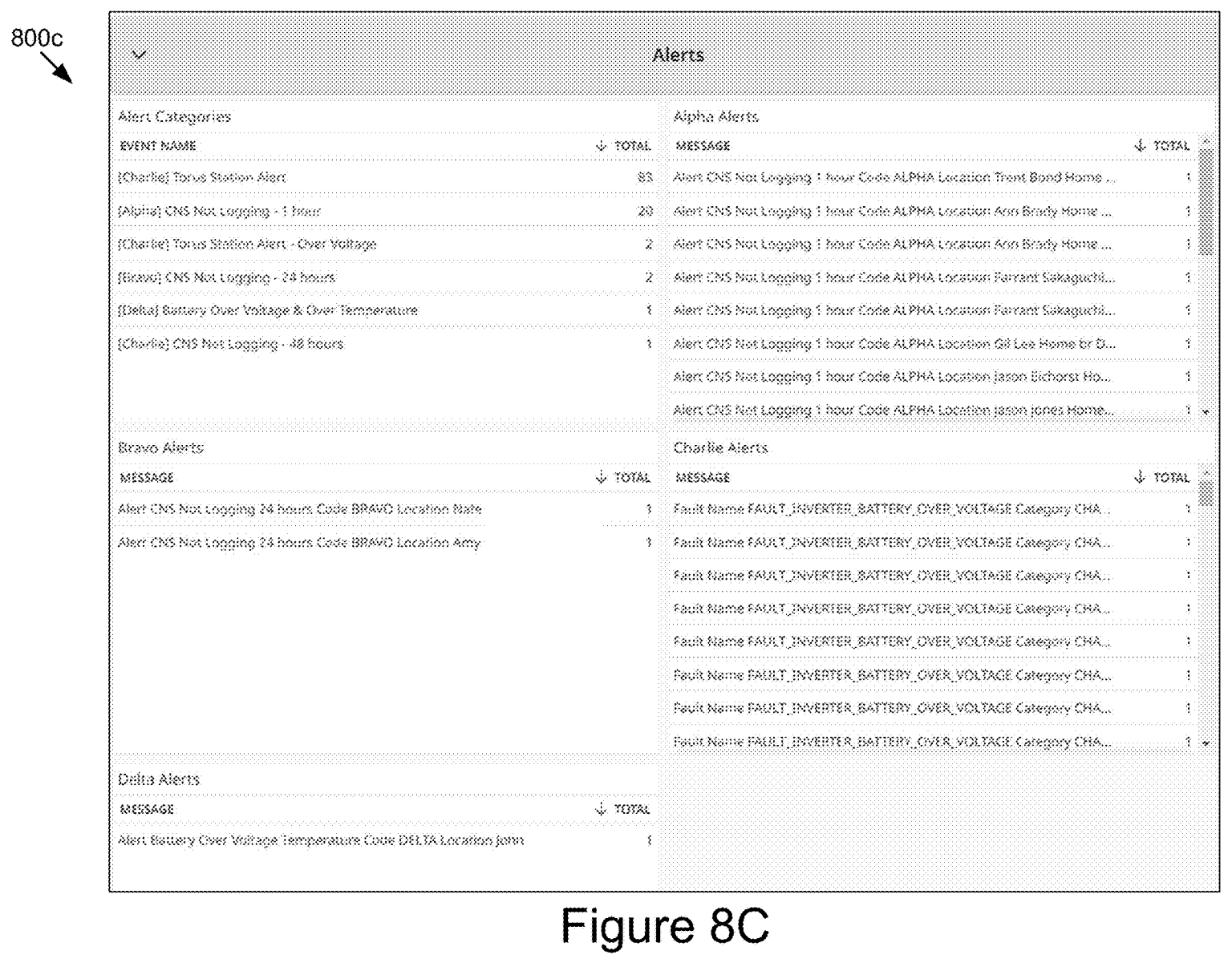

FIGS. 8A-8C illustrate example interfaces 800a, 800b, and 800c in which faults are identified for one or more ESUs 402. For instance, scrolling down on the interface 800a may show interface 800b and, in turn, scrolling down on interface 800b may show interface 800c. As illustrated, data may be analyzed (e.g., by an analysis server, CDR server(s) 116, etc., as described above) and aggregated over a plurality of ESUs 402 to provide visibility for safety, maintenance, repairs, etc. For instance, the interface(s) 800a-800c in FIGS. 8A-8C may be displayed to an administrative user overseeing a group of ESUs 402, for example, in a state, city, energy utility area, subdivision, etc.

FIG. 8A shows a list of events, which may represent faults, which include time stamps, locations, device IDs, fault category/severity, fault name, and other details. The interface 800a may also show bucketized lists of faults based on category/severity level, so that a user can easily ascertain which faults have the highest priority. Furthermore, the interface 800a may show a history of alerts to indicate an aging of each type of alert and therefore an overall health and maintenance level of a cluster of nodes, ESUs 402, or other devices.

As shown in the example interface 800b of FIGS. 8B and 800c of FIG. 8C, graphical boxes may also be shown displaying lists of details for each category of fault. For instance, graphical subdivisions of the interfaces 800b and 800c list details for various alerts/alert levels, such as their quantity, priority, location, name, severity, aging (e.g., how long since the event occurred or started occurring), messages, assigned response personnel, category, tag, or other data.

Figure 9A:
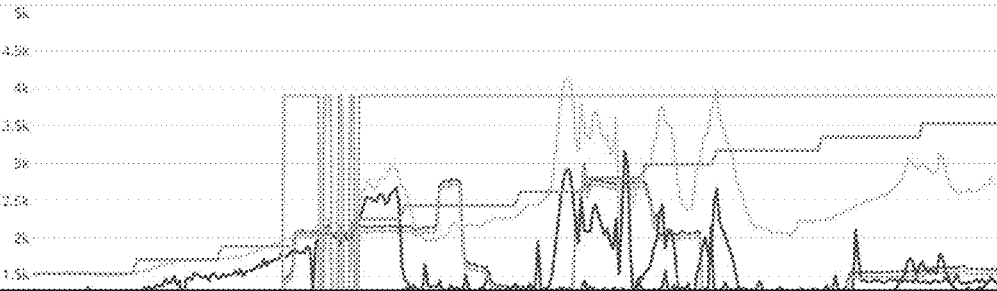
FIGS. 9A and 9B illustrate graphical interfaces showing health telemetry data across one or more energy storage units.
Figure 9B:
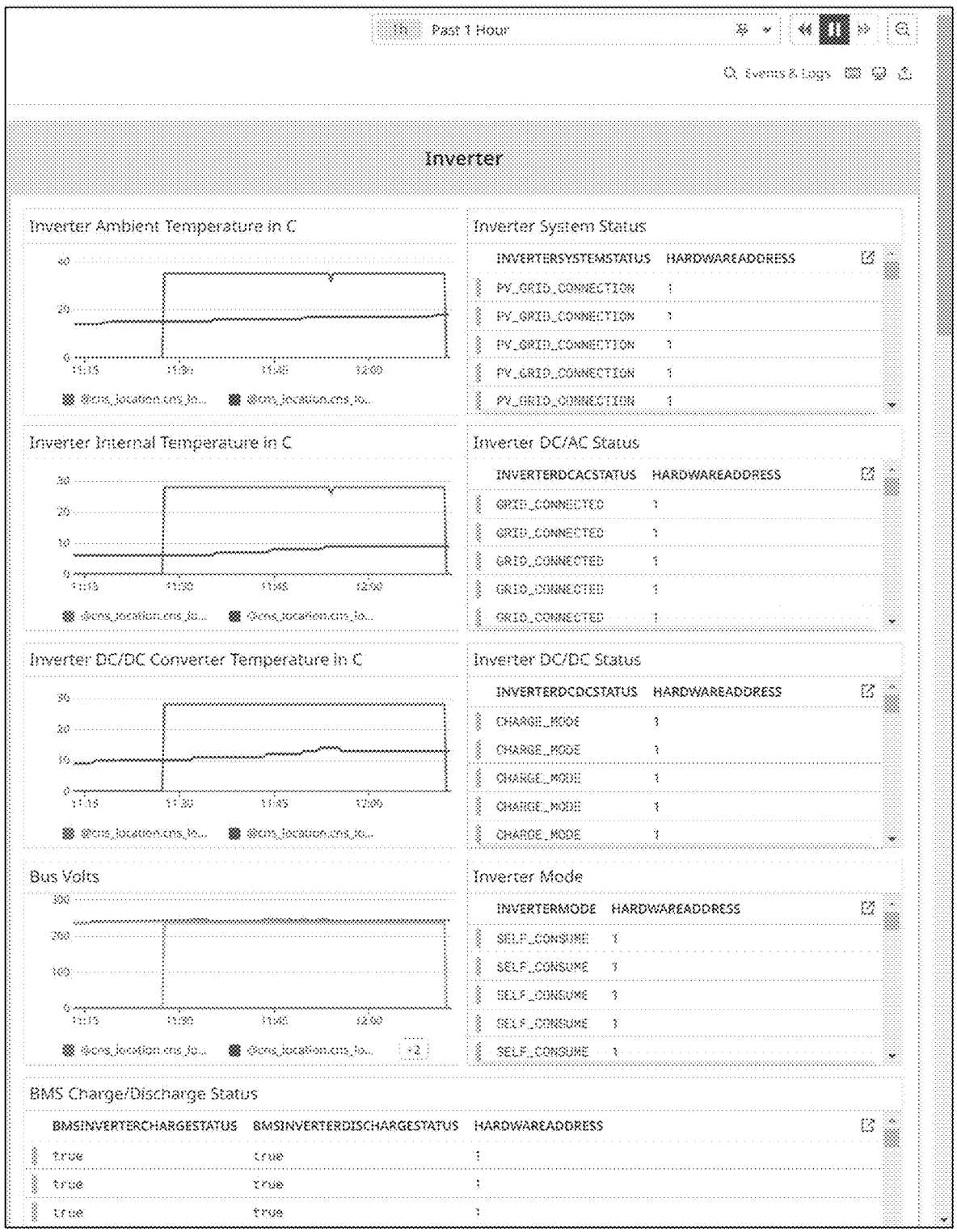

FIGS. 9A and 9B illustrate graphical interfaces 900a and 900b showing health telemetry data across one or more ESUs 402 generated, for example, by the CDR server(s) 116 (e.g., the analytics server 406). The interfaces 900a and 900b may be displayed together on a single computer display, for example, side by side, vertically (e.g., when scrolling), or may otherwise be dynamically arranged based on display or window size and resolution.

The interfaces 900a and 900b may display real-time or near real-time, updated graphs and lists for each of the types of data or sensors monitored for selected ESU(s) 402 or node(s). Depending on the implementation, additional or fewer graphs for one or more locations or ESUs 402 may be shown. The graphs, lists, and other graphical elements may be automatically updated as data is received from the ESU(s) 402.

In some implementations, the graphical user interfaces 900a and 900b may additionally or alternatively display information specifically for one or more components of an ESU 402, node, or network thereof. For instance, the interfaces 900a and 900b may include graphical divisions, frames, or widgets that display information for an inverter 414, chemical battery, or flywheel energy storage system (FESS). It should be noted that additional or fewer widgets may be added depending on configuration of an ESU 402/node or based on user preferences. For example, the interfaces 900a and 900b may display data and analytics specifically for a FESS, such as flywheel RPMs, battery volts, battery amps, battery watts, FESS capacity percent, leak rate (e.g., due to friction), vacuum pressure, FESS energy in watt hours, battery watts, solar watts, usage watts, grid watts, upper and lower bearing temperatures, motor temperature, or other data.

For instance, the analytics server 406 or another component (e.g., as described above) of the system may collect, aggregate, analyze, and display Wi-Fi signal strength, MQTT messages dropped, RS485 retry counter and date, MQTT offline que, MQTT messages sent count, inverter ambient temperature, inverter internal temperature, inverter DC/DC converter temperature, bus volts, inverter system status, inverter DC/AC status, inverter DC/DC status, inverter mode, usage by various devices (from the grid, solar, storage watts, etc.), state of charge, BMS charge/discharge status, solar volts and watts, solar amps, grid, inverter, electricity sensor data, usage watts, storage watts, solar watts, electricity meter phase A/B, grid watts, flywheel rpms, upper bearings temperature, lower bearings temperature, vacuum pressure, battery amps, battery charge volts, battery volts, battery storage capacity percent, battery discharge amps, battery temperature, battery charge amps, battery watts, zero current calibration factor, storage (watts), battery (amps), battery (volts), and storage capacity, storage (capacity percent), impedance, battery (charge amps), battery (discharge amps, temperature, whether the inverter is in grid-powered bypass mode, and other data, although other data is possible and contemplated.

Accordingly, the CDR server(s) 116 may have access to various data that is received from sensors or other data sources or derived therefrom, which it may use in the operations described above. The analytics may be displayed in a graphical user interface (e.g., 900a or 900b) and/or used to detect faults, alerts, severity levels, etc., as described above. Furthermore, where a human is viewing the interfaces, the analysis server may overlay data for multiple devices so that differences (e.g., anomalous events) may be more easily discerned.

Figure 10:
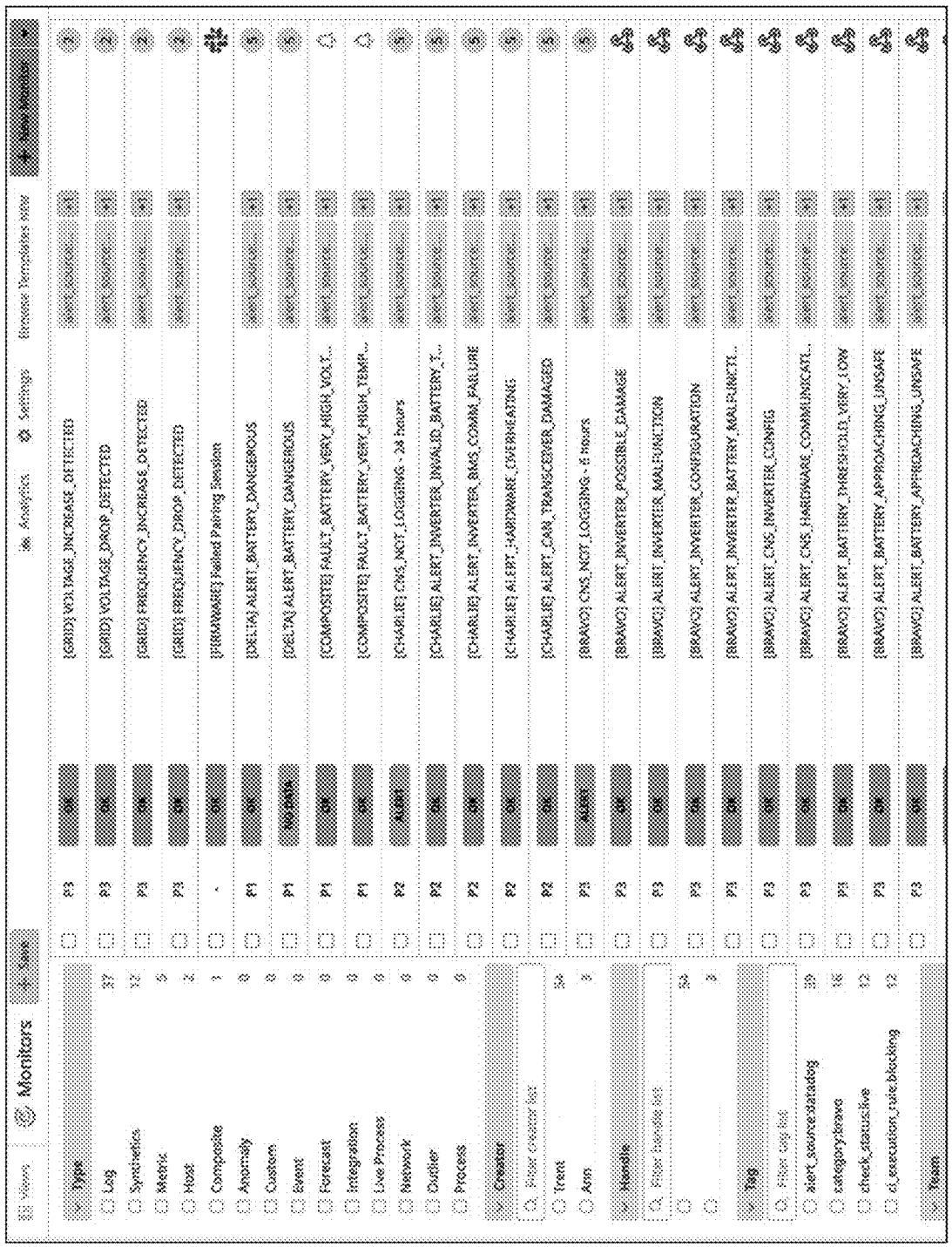
FIG. 10 illustrates an example graphical user interface in which various event monitors are listed.

FIG. 10 illustrates an example graphical user interface 1000 in which various monitors are listed, along with alert status and filtering data (e.g., priority, type, muted, etc.). Monitors may include rules or logic that monitor event data from ESUs 402. For instance, a monitor may determine and/or classify types of events, compare event data against thresholds, quantities, qualities, etc., to determine whether the event includes a fault. Other example implementations are possible and contemplated.

For example, a list of events may be displayed along with a priority level, alert severity, alert source, tags, sources, or other data. In some implementations, the interface 1000 may allow the events to be filtered by type (e.g., metric, forecast, network, outlier, etc.), which may be associated with tags on alerts generated by a CNS 412, CDR server(s) 116 (e.g., by an IoT core 422, cloud computing service 424, analytics server 406, CDR management service 466, etc.). Similarly, the events (e.g., events, faults, or alerts) may be filtered by creator, creator handle, tag, category, responsible team/stakeholder, scope, or other types of data. Additionally, each line, status indicator, or other field for the events in the interface 1000 may automatically be changed based on the status of the event, whether the event is an alert, alert severity level, or response status.

FIGS. 11A-11F illustrate example mobile graphical user interfaces 1100*a*-1100*f* that may be displayed to a stakeholder, such as an administrator or customer. The example mobile interfaces 1100*a*-1100*f* may reduce the data described above into a format that is viewable on a mobile device with limited display or inputs. For instance, the interfaces 1100*a*-1100*f* show graphs of energy use, solar production, battery capacity and state, consumption from the grid, etc. The mobile interfaces 1100*a*-1100*f*, like the other interfaces described above, may be selected and enlarged, the various types of data may be overlaid, and data points may be selected to view their values. It should be noted that other implementations and features are possible and contemplated.

For example, as described above, a user application 172 may query data from a CDR server(s) 116, such as from a backend database 426, 458, or 460, analytics server 406, CDR management service 466, or another device. The user application 172 may select the data based on a login, authorization, permissions, preferences, or roles of the user. For instance, if the user is an administrator or engineer, alert, telemetry, or diagnostic data may be displayed. If the user is a customer, the user application 172 may automatically retrieve and display information associated with that user's account, such as data for their own node/ESU 402 at their residence.

Figure 11A:
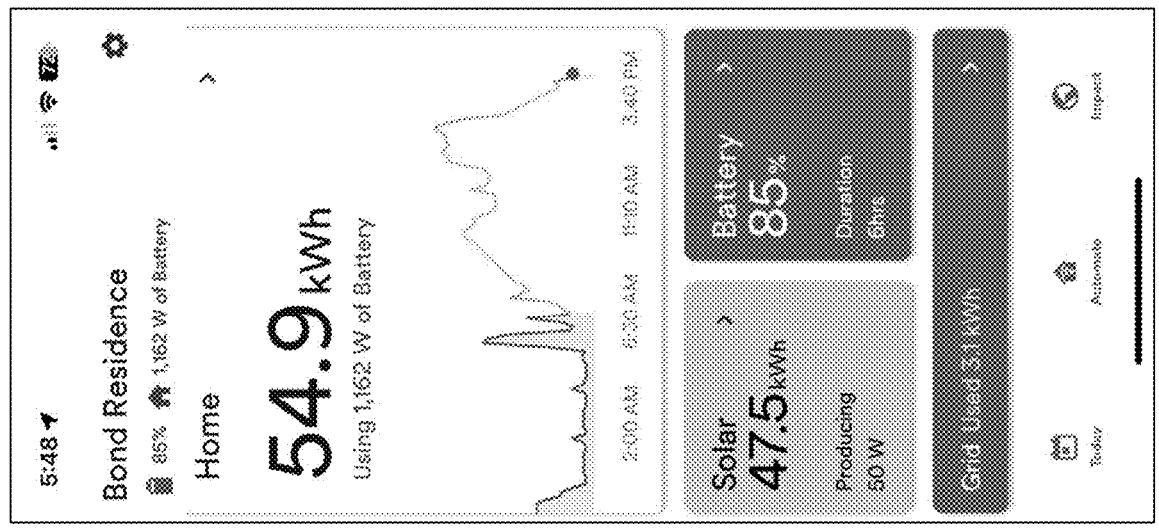
FIGS. 11A-11F illustrate example graphical user interfaces showing energy storage unit analytics and data.

FIG. 11A illustrates an example graphical user interface 1100*a*, which may be displayed on a client device. The example interface 1100*a* may display solar production (current or total), battery percentage and health, status of moving power to/from the grid, or other details. These values may be shown in graphical widgets in text and/or graph formats.

Figure 11B:
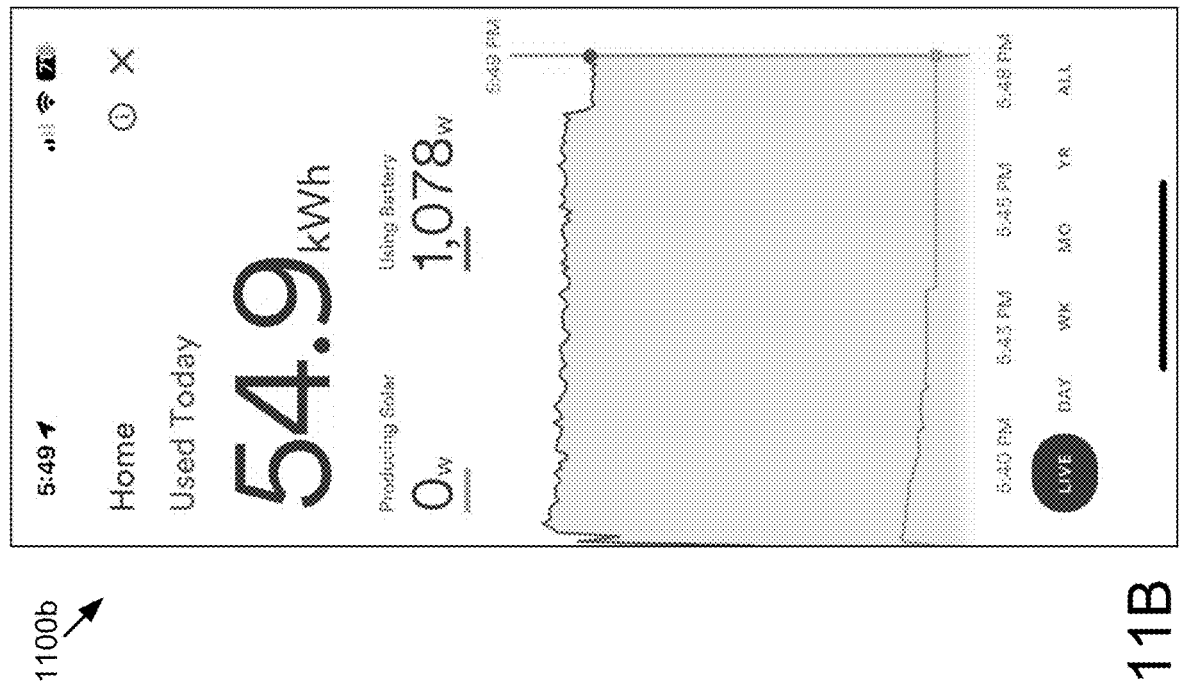
Figure 11C:
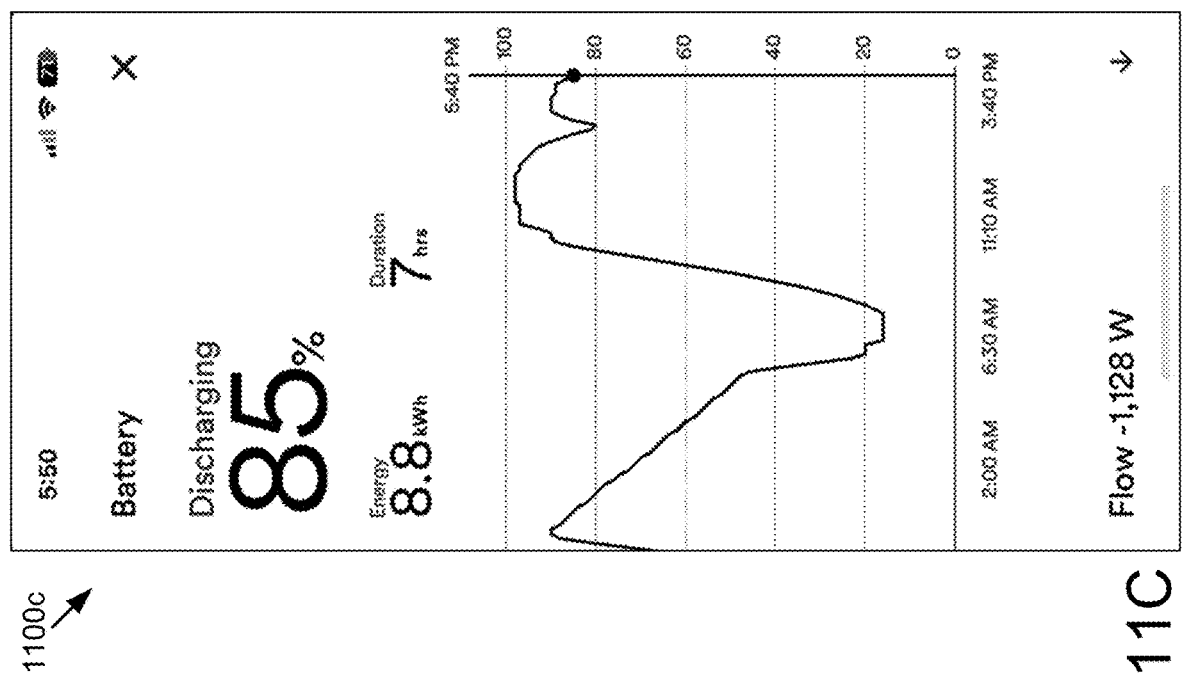
Figure 11D:
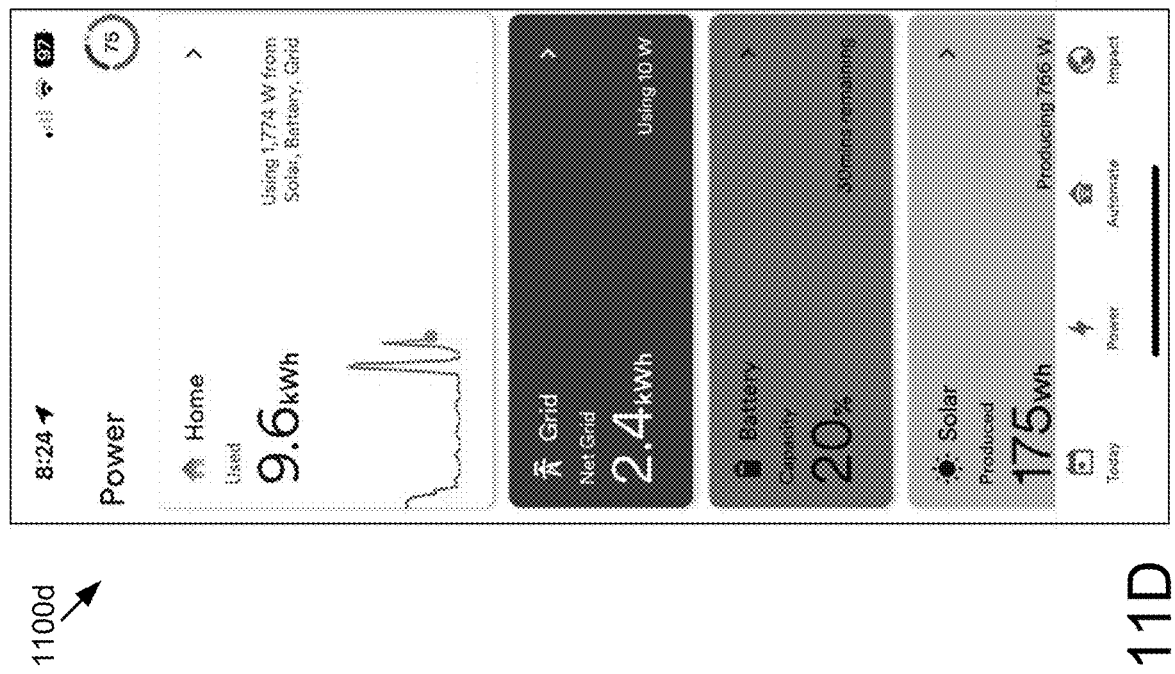
Figure 11E:
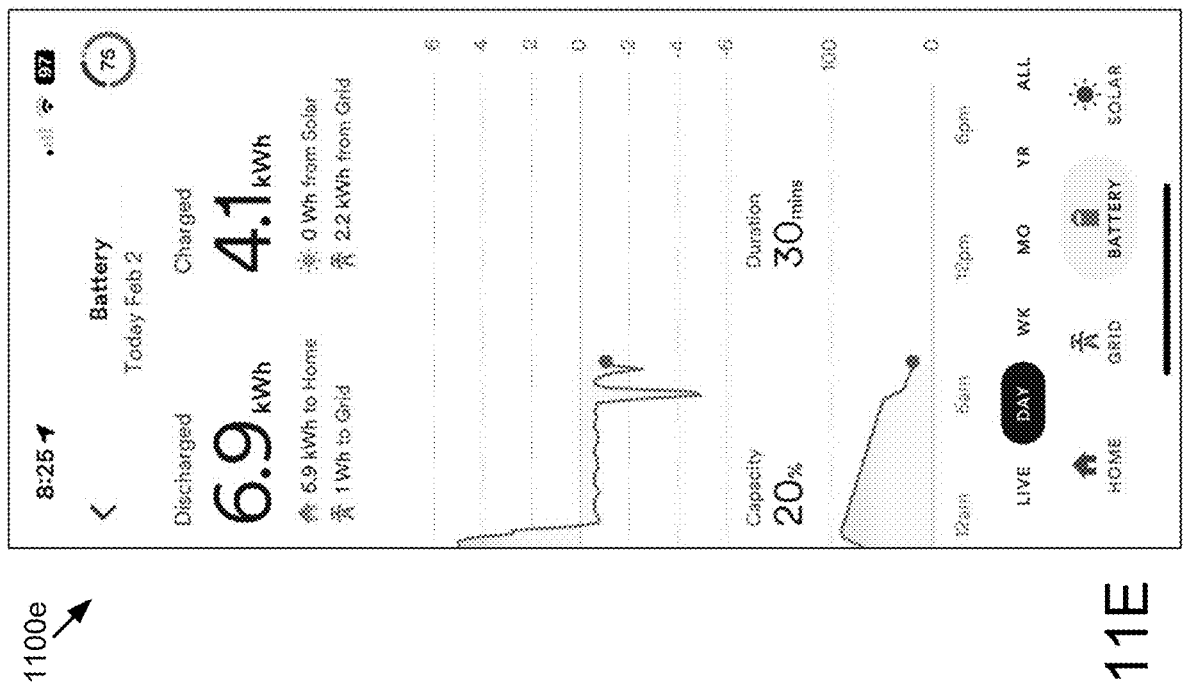
Figure 11F:
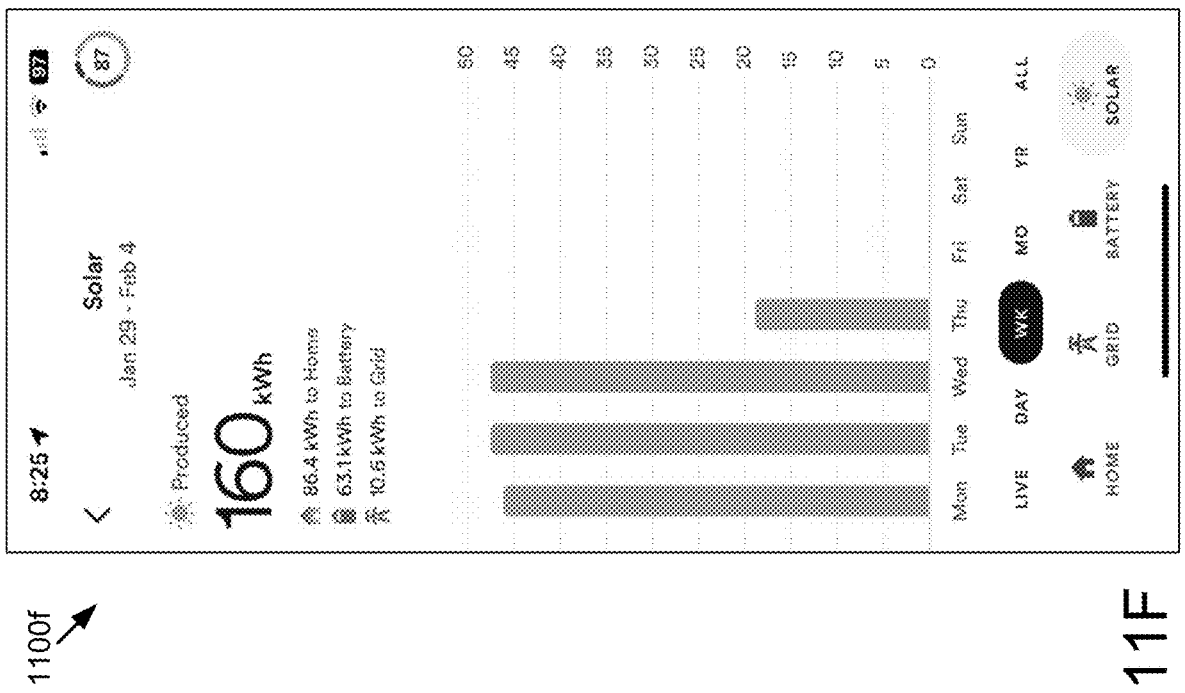

FIG. 11B illustrates an example graphical user interface 1100*b* showing kilowatt hours used at a given node over a defined time period (a day) including how much is received from solar, battery, etc. FIG. 11C illustrates an example graphical user interface 1100*c* displaying a charge percentage of a battery 416, whether it is charging or discharging, an available energy, a projected battery life, or other data. FIG. 11D illustrates an example graphical user interface 1100*d* displaying graphical elements indicating power current and/or total power usage from various sources, such as from the grid, battery 416, solar, and/or other power sources. The interface 1100*d* may automatically adjust the color or shade of each graphical element to indicate how much power is being used, stored, or generated from each source. FIG. 11E illustrates an example graphical user interface 1100*e* displaying an amount charged or discharged total over a selected time period (live, day, week, month, year, all, etc.) and how much was charged or discharged at various times (e.g., in a line graph) from a selected device. For instance, the interface 1100*e* may include tabs or icons from which a home screen, grid screen, battery usage display, solar display, etc., may be selected. FIG. 11F illustrates an example graphical user interface 1100*f* displaying a solar tab of an example user application 172 in which solar power production and routing (e.g., whether the power was used, stored in a battery 416, transferred to a grid, etc.) is illustrated (e.g., in textual and date-linked bar chart formats).

For instance, as data is gathered from a CNS 412 or other computing devices coupled with the inverter 414, battery 416, flywheel, or sensors (e.g., current sensors) at a node, it may be processed as event data and stored in the database(s) (e.g., 426, 458, and 460), as discussed above. For instance, as described in reference to FIGS. 4A and 4B, if event data is not classified as a fault (or if it is also classified as a fault), it may be processed and routed to the database(s) for review by users (e.g., using a user application 172).

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A computer-implemented method comprising:
    receiving, by one or more processors, event data describing one or more events associated with an energy storage unit;
    determining, by a local processor of the one or more processors, that the one or more events include a fault based on whether the one or more events include an anomalous status of the energy storage unit, the local processor being local to the energy storage unit;
    determining, by the one or more processors, whether the fault is automatically addressable;
    responsive to determining that the fault is automatically addressable, automatically executing, by the one or more processors, one or more actions based on the fault;
    responsive to determining an escalation condition, automatically reporting, by the local processor, the event data describing the fault to a remote processor of the one or more processors, the remote processor being remote from the local processor, the remote processor classifying the fault to an alert type; and
    automatically providing, by the one or more processors, a notification describing the fault to a user based on the alert type.

2. The computer-implemented method of claim 1, further comprising:
    automatically classifying, by the local processor, the one or more events include the fault based on the anomalous status; and
    identifying the user from among multiple users based on the alert type.

3. The computer-implemented method of claim 1, further comprising:
    determining, by the one or more processors, that the one or more actions were not effective in resolving the fault based on data received from the energy storage unit, the escalation condition including that the one or more actions were not effective; and
    automatically reclassifying, by the remote processor of the one or more processors, a severity level of the fault in a database.

4. The computer-implemented method of claim 1, wherein automatically providing the notification to the user includes:
- determining, by the remote processor of the one or more processors, the alert type based on whether the fault is time sensitive and whether the fault is classified as potentially causing harm;
- determining, by the one or more processors, an assigned user responsible for addressing the alert type of the fault; and
- automatically routing, by the one or more processors, the notification to the assigned user.

5. The computer-implemented method of claim 1, wherein:
- the energy storage unit includes a controller, an inverter, and a battery, the controller being communicatively with the inverter, the controller generating the event data based on data received from the inverter.

6. The computer-implemented method of claim 1, wherein:
- the energy storage unit includes a controller, an inverter, a battery, and one or more sensors, the controller being communicatively with the inverter and the one or more sensors, the controller generating the event data based on sensor data received from the one or more sensors.

7. The computer-implemented method of claim 6, wherein:
- the controller detects the fault based on anomalous sensor data.

8. The computer-implemented method of claim 1, wherein:
- the energy storage unit includes a controller, an inverter, and a battery, the controller determining the fault and transmitting data describing the fault to a remote server; and
- the remote server routes the event data describing the fault to one or more of a backend database and an analytics service based on the event data describing the fault.

9. The computer-implemented method of claim 8, wherein:
- the analytics service determines a severity of the fault based on whether an intervention to the fault is possible and whether the fault is time sensitive; and
- the analytics service classifies the fault as the alert type based on the severity of the fault.

10. The computer-implemented method of claim 9, further comprising:
- determining, by the one or more processors, alert routing rules defining to which users the notification is provided based on the alert type.

11. The computer-implemented method of claim 1, further comprising:
- determining one or more non-fault events from the one or more events;
- routing the event data describing the one or more non-fault events to a database for data storage;
- routing the event data describing the fault to an analytics server that analyzes the fault;
- determining an alert level of the fault;
- selecting the user from a set of users based on the alert level of the fault; and
- providing the notification to the selected user based on the alert level.

12. The computer-implemented method of claim 11, wherein:
- selecting the user from the set of users is further based on context data associated with the fault, the context data including a geographic location at which the energy storage unit is located.

13. A system comprising:
- an energy storage unit including:
  - a battery storing energy mechanically or chemically;
  - an inverter coupled with the battery and converting direct current from the battery to alternating current; and
  - a controller communicatively coupled with the inverter, the controller receiving data from one or more sensors associated with the energy storage unit and controlling one or more functions of the battery; and
- one or more processors executing instructions that cause the one or more processors to perform operations comprising:
  - receiving, by a local processor of the one or more processors, event data describing one or more events associated with the energy storage unit;
  - determining, by the one or more processors, that the one or more events include a fault based on whether the one or more events include an anomalous status of the energy storage unit, the local processor being local to the energy storage unit;
  - determining, by the one or more processors, whether the fault is automatically addressable;
  - responsive to determining that the fault is automatically addressable, automatically executing, by the one or more processors, one or more actions based on the fault;
  - responsive to determining an escalation condition, automatically reporting, by the local processor, the event data describing the fault to a remote processor of the one or more processors, the remote processor being remote from the local processor, the remote processor classifying the fault to an alert type; and
  - automatically providing, by the one or more processors, a notification describing the fault to a user based on the alert type.

14. The system of claim 13, wherein the operations further comprise:
- automatically classifying, by the controller, the one or more events include the fault based on the anomalous status; and
- automatically reporting, by the controller, the event data describing the fault to the remote processor of the one or more processors based on the one or more events including the fault, the remote processor being remote to the controller.

15. The system of claim 13, wherein the operations further comprise:
- determining that the one or more actions were not effective in resolving the fault based on data received from the energy storage unit, the escalation condition including that the one or more actions were not effective; and
- automatically reclassifying a severity level of the fault in a database.

16. The system of claim 13, wherein automatically providing the notification to the user includes:
- determining the alert type based on whether the fault is time sensitive and whether the fault is classified as potentially causing harm;
- determining an assigned user responsible for addressing the alert type of the fault; and automatically routing the notification to the assigned user.

17. The system of claim 13, wherein:
the controller generates the event data based on data received from the inverter.

18. The system of claim 13, wherein:
the energy storage unit includes the one or more sensors, the controller being communicatively coupled with the one or more sensors, the controller generating the event data based on sensor data received from the one or more sensors.

19. The system of claim 18, wherein:
the controller detects the fault based on anomalous sensor data.

20. A system comprising:
one or more processors; and
computer-readable memory storing instructions that, when executed by the one or more processors, perform operations comprising:
receiving, by a local processor of the one or more processors, event data describing one or more events associated with an energy storage unit based on whether the one or more events include an anomalous status of the energy storage unit, the local processor being local to the energy storage unit;
determining, by the one or more processors, that the one or more events include a fault;
determining, by the one or more processors, whether the fault is automatically addressable;
responsive to determining that the fault is automatically addressable, automatically executing, by the one or more processors, one or more actions based on the fault;
responsive to determining that the one or more actions were not effective in addressing the fault, automatically reporting, by the local processor, the event data describing the fault to a remote processor of the one or more processors, the remote processor determining a severity level of the fault based on the event data associated with the fault; and
automatically providing, by the one or more processors, a notification indicating the fault to a user based on the severity level of the fault.

\* \* \* \* \*